(12) United States Patent (10) Patent No.: US 12,402,032 B2
Rossbach et al. (45) Date of Patent: Aug. 26, 2025

(54) COMMUNICATION DEVICES AND METHODS FOR CONCATENATING SERVICE DATA UNITS

(71) Applicant: Apple Inc., Cupertino, CA (US)

(72) Inventors: Ralf Rossbach, Neubiberg (DE); Fangli Xu, Beijing (CN); Alexander Sirotkin, Tel Aviv (IL); Bobby Jose, San Diego, CA (US); Dawei Zhang, Saratoga, CA (US); Francois E. Deparis, Zirndorf (DE); Haijing Hu, Los Gatos, CA (US); Mohamed Mounir Mohamed Abdelrahman, Unterhaching (DE); Murali Narasimha, San Ramon, CA (US); Murtaza A. Shikari, Mountain View, CA (US); Naveen Kumar R. Palle Venkata, San Diego, CA (US); Pavan Nuggehalli, San Carlos, CA (US); Ralf Itjeshorst, Walpertskirchen (DE); Sarma V. Vangala, Campbell, CA (US); Sethuraman Gurumoorthy, San Ramon, CA (US); Vijay Venkataraman, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/796,633

(22) PCT Filed: Sep. 3, 2021

(86) PCT No.: PCT/CN2021/116557
§ 371 (c)(1),
(2) Date: Jul. 29, 2022

(87) PCT Pub. No.: WO2023/029013
PCT Pub. Date: Mar. 9, 2023

(65) Prior Publication Data
US 2024/0187919 A1 Jun. 6, 2024

(51) Int. Cl.
*H04W 28/04* (2009.01)
*H04L 1/00* (2006.01)
(Continued)

(52) U.S. Cl.
CPC ........... *H04W 28/04* (2013.01); *H04L 1/0064* (2013.01); *H04W 28/0268* (2013.01); *H04W 76/20* (2018.02); *H04W 80/02* (2013.01)

(58) Field of Classification Search
CPC . H04W 28/04; H04W 28/0268; H04W 76/20; H04W 80/02; H04L 1/0064
See application file for complete search history.

(56) References Cited

U.S. PATENT DOCUMENTS

2009/0252182 A1* 10/2009 Maheshwari ....... H04W 28/065
370/474
2010/0322197 A1* 12/2010 Adjakple ............... H04B 7/155
370/332
(Continued)

FOREIGN PATENT DOCUMENTS

CN 102300259 A 12/2011
CN 110808814 A 2/2020

OTHER PUBLICATIONS

Concatenation at PDCP, 3GPP TSG-RAN WG2 #97, MediaTek Inc., Tdoc R2-1701707, Feb. 17, 2017, 3 pages.
(Continued)

*Primary Examiner* — Mohammad S Anwar
(74) *Attorney, Agent, or Firm* — Kilpatrick Townsend & Stockton LLP

(57) ABSTRACT

The present application relates to devices and components including apparatus, systems, and methods for concatenat-
(Continued)

ing in the packet data convergence protocol sublayer or the service data adaptation sublayer in wireless networks.

19 Claims, 11 Drawing Sheets

(51) Int. Cl.
*H04W 28/02* (2009.01)
*H04W 76/20* (2018.01)
*H04W 80/02* (2009.01)

(56) References Cited

U.S. PATENT DOCUMENTS

| | | | | |
|---|---|---|---|---|
| 2018/0097918 | A1 | 4/2018 | Nuggehalli et al. | |
| 2019/0349161 | A1* | 11/2019 | Jin | H04L 5/001 |
| 2020/0059817 | A1* | 2/2020 | Baek | H04W 28/0273 |
| 2020/0382254 | A1* | 12/2020 | Han | H04L 5/0048 |
| 2022/0030659 | A1* | 1/2022 | Kim | H04W 76/19 |

OTHER PUBLICATIONS

Concatenation at SDAP, 3GPP TSG-RAN WG2 Meeting #97bis, R2-1702596, Spokane, Apr. 7, 2017, 2 pages.

PCT/CN2021/116557, International Search Report and Written Opinion, Apr. 26, 2022, 9 pages.

3rd Generation Partnership Project; Technical Specification Group Radio Access Network; NR; NR and NG-RAN Overall Description; Stage 2 (Release 16), 3GPP TS 38.300 V16.6.0, Jun. 2021, 152 pages.

3rd Generation Partnership Project; Technical Specification Group Radio Access Network; NR; Packet Data Convergence Protocol (PDCP) specification (Release 16), 3GPP TS 38.323 V16.4.0, Jun. 2021, 40 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

* cited by examiner

COMMUNICATION DEVICES AND METHODS FOR CONCATENATING SERVICE DATA UNITS

CROSS-REFERENCE TO RELATED APPLICATION

This application is a 371 U.S. National Phase of PCT International Patent Application No. PCT/CN2021/116557, filed Sep. 3, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related to operations at various layers of a protocol stack. A layer 2 (L2) of NR networks is split into various sublayers including: a medium access control (MAC), a radio link control (RLC), a packet data convergence protocol (PDCP) layer, and a service data adaptation protocol (SDAP).

DETAILED DESCRIPTION

Figure 1:
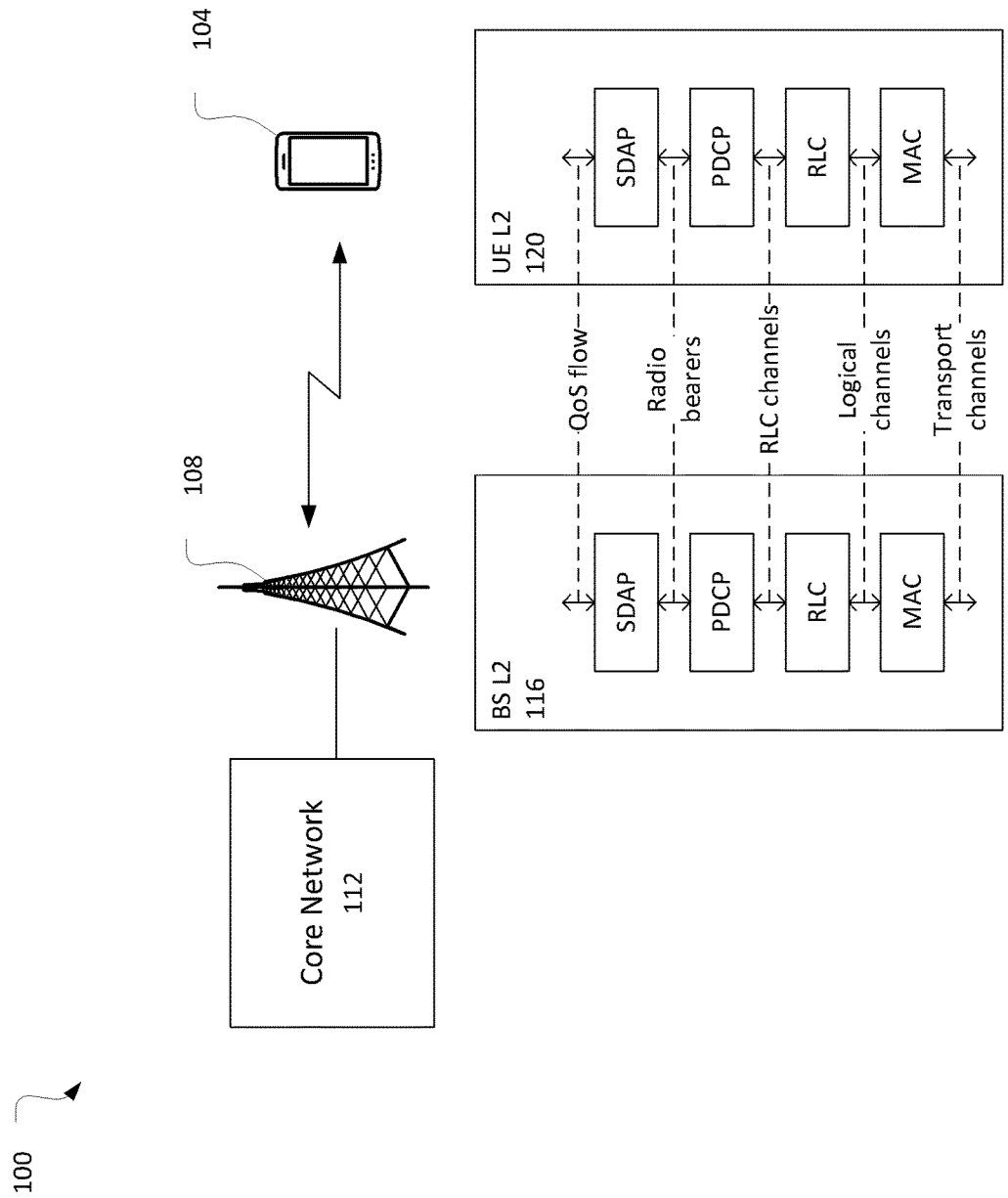
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with a base station such as, for example, base station 108. The UE 104 and the base station 108 may communicate over air interfaces compatible with 3GPP TSs such as those that define Fifth Generation (5G) NR system standards. The base station 108 may be a next generation node B (gNB) to provide one or more 5G New Radio (NR) cells to provide NR user plane and control plane protocol terminations toward the UE 104.

In some embodiments, the base station 108 and one or more additional base stations may be arranged to provide the UE 104 service through a dual connectivity (DC) configuration such as, for example, a multi-radio access technology-DC (MR-DC).

The network environment 100 may further include a core network (CN) 112. For example, the CN 112 may comprise a 5$^{th}$ Generation Core network (5GC). The CN 112 may be coupled to the base station 108 via a fiber optic or wireless backhaul. The CN 112 may provide functions for the UE 104 via the base station 108. These functions may include managing subscriber profile information, subscriber location, authentication of services, or switching functions for voice and data sessions.

The base station 108 may have circuitry, for example, BS L2 116, to implement L2 functionality including SDAP, PDCP, RLC, and MAC sublayer functionality. Similarly, the UE 104 may have circuitry, for example, UE L2 120, to implement similar L2 functionality so that the UE 104 and the base station 108 are communicatively coupled by transport channels, logical channels, RLC channels, radio bearers, and quality of service (QoS) flows.

Briefly, the MAC sublayer may manage scheduling/priority handling, (de)multiplexing, and HARQ processes between logical channels and transport channels. The RLC sublayer may manage (re-)segmentation and error correction through automatic repeat request (ARQ) between logical channels and RLC channels. The PDCP sublayer may manage robust header (de)compression and security between radio bearers and RLC channels. And the SDAP sublayer may manage QoS flow handling between the QoS flows and the radio bearers. In the downlink, a sublayer may convert service data units (SDUs) into protocol data units (PDUs) for provision to lower sublayers. In the uplink, a sublayer may convert PDUs to SDUs for provision to upper sublayers.

In 3GPP Releases 15, 16, and 17, L2 NR concatenation of SDUs may occur at the MAC sublayer. In particular, the MAC sublayer may generate a MAC PDU, for example, a transport block, that includes a plurality of MAC SDUs. The MAC SDUs may correspond to RLC PDUs from one or more resource blocks (RBs). Consider, for example, that a MAC PDU includes a first set of RLC PDUs from a first RB (RBx) and one RLC PDU from a second RB (RBy). Each RLC PDU of the first set of RLC PDUs may correspond to one IP packet, for example, a first RLC PDU of the first set may correspond to IP packet n and a second RLC PDU of the first set may correspond to IP packet n+1, while the RLC PDU from RBy corresponds to a segment of IP packet m.

Concatenating at the MAC sublayer may be associated with advantages for hardware processing at high data rates, but may come at the cost of additional L2 header processing overhead. The L2 header processing overhead may include portions of header processing for every SDU at multiple sublayers. The time required for payload processing may not scale linearly with the payload size. This cost may result in significant central processing unit (CPU) load increases when there are a large number of small packets to be processed. A large number of packets may be generated by transmission control protocol (TCP) acknowledgments (ACKs), extended reality (XR) applications, and applications with many small packets where latency is not too critical.

To address the shortcomings of the concatenation at the MAC sublayer, embodiments of the present disclosure describe concatenation at higher sublayers including concatenation at the PDCP sublayer and the SDAP sublayer.

The PDCP sublayer supports the following functions: transfer of user/control plane data; maintenance of PDCP sequence numbers (SNs); header compression and decompression using a robust header compression (RoHC) protocol; header compression and decompression using Ethernet header compression (EHC); ciphering and deciphering; integrity protection and verification; timer based SDU discard; routing first split bearers and dual active protocol stack (DAPS) bearers; duplication; reordering and in-order delivery; out-of-order delivery; and duplicate discarding.

Based on the current PDCP design, the PDCP SDU to PDCP PDU is a 1-to-1 mapping. Security is handled per PDCP SDU and one PDCP header is added per PDCP PDU. The current PDCP design does not efficiently handle multiple small packets that arrive in a short time and will be transmitted together.

Some embodiments describe PDCP concatenation when multiple small packets from one data radio bearer (DRB) arrive in a short time and are to be assembled into one PDCP PDU. This PDCP concatenation may improve efficiency of L2 header processing and reduce PDCP processing time by reducing the number of times security handling is run to one. Some embodiments may include multiple MAC/RLC/PDCP PDUs, each having one or more concatenated PDCP SDUs. Thus, embodiments may be used with existing concatenation at the MAC level, for example.

Figure 2:
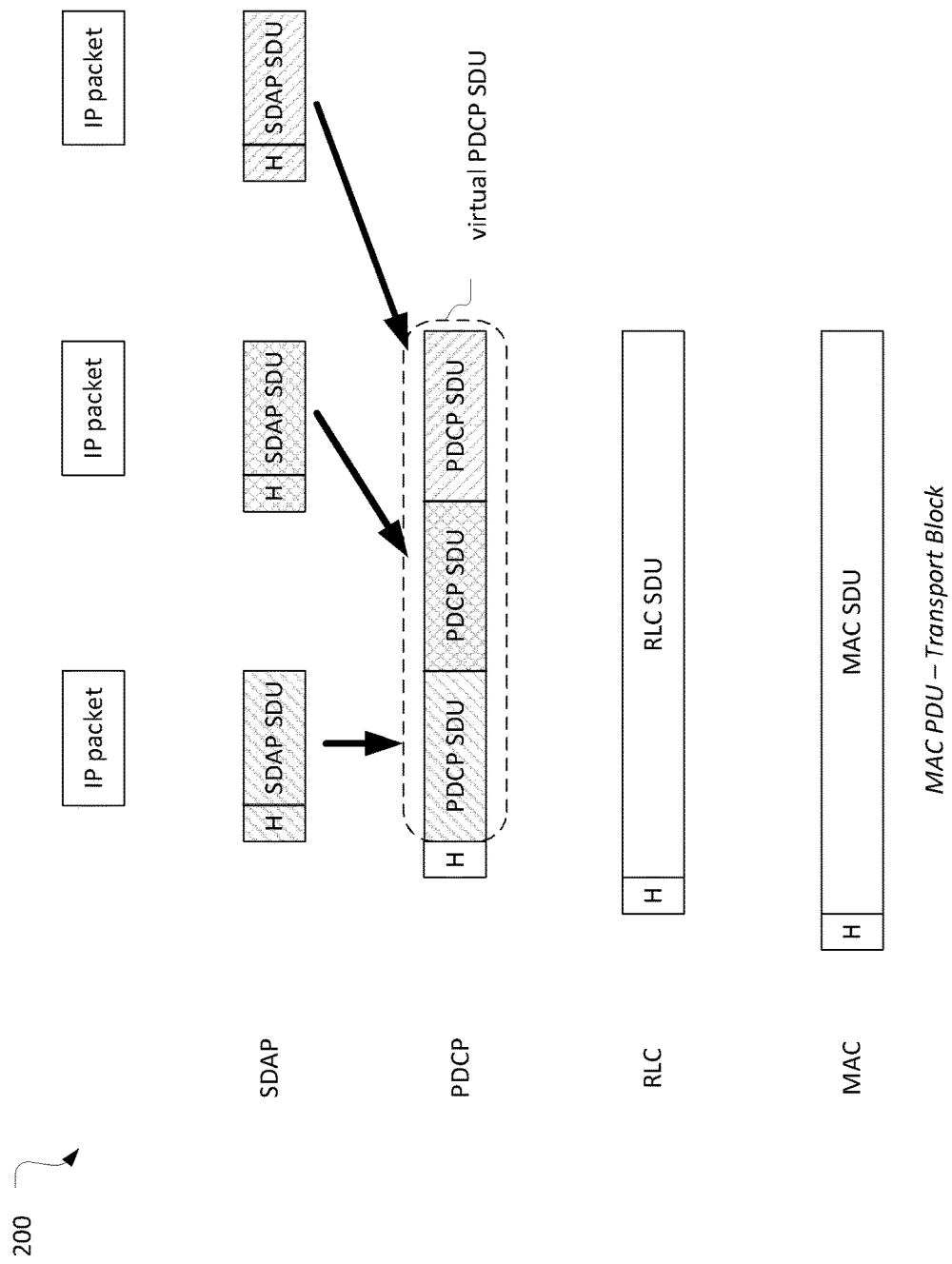
FIG. 2 illustrates layer 2 processing in accordance with some embodiments.

FIG. 2 illustrates L2 processing 200 in accordance with some embodiments. The L2 processing 200 may include an SDAP sublayer receiving IP packets. Each IP packet may correspond to an SDAP SDU. The SDAP sublayer may add a header to the SDAP SDU to generate an SDAP PDU.

Each SDAP PDU may correspond to a PDCP SDU. The L2 processing 200 may further include a PDCP sublayer concatenating a plurality of PDCP SDUs into a virtual PDCP SDU, which may also be referred to as a concatenated or pseudo PDCP SDU. As shown, the virtual PDCP SDU may include three PDCP SDUs. The PDCP sublayer may add a header to the virtual PDCP SDU to generate a PDCP PDU.

By concatenating a plurality of PDCP SDUs into one PDCP PDU, the L2 processing 200 may be simplified. For example, the PDCP sublayer may only need to: perform security processing one time instead of three times; add one message authentication code-integrity (MAC-I) instead of three; and add one header instead of three. Further, the RLC sublayer may also only need to add one header instead of three.

SDU-level operations by the PDCP layer may be performed on the virtual PDCP SDU as opposed to the individual PDCP SDUs. For example, the PDCP sublayer may perform a ciphering on the virtual PDCP SDU as a whole; and the COUNT, which may be used for both ciphering and integrity protection, may be incremented based on the virtual PDCP SDU (incremented by one per virtual PDCP SDU) rather than the individual PDCP SDUs.

The PDCP PDU may correspond to an RLC SDU. The L2 processing 200 may further include an RLC sublayer generating an RLC PDU by adding a header to the RLC SDU.

The RLC PDU may correspond to a MAC SDU. The L2 processing 200 may further include a MAC sublayer generating a MAC PDU by adding a header to the MAC SDU. The MAC PDU may correspond to a transport block.

Given that the concatenation was done by the PDCP sublayer, the MAC sublayer may not need to concatenate more than one RLC PDU into a MAC PDU.

While the PDCP concatenation shown in L2 processing 200 illustrates three PDCP SDUs combined into one virtual PDCP SDU, other embodiments may combine other numbers of PDCP SDUs. For example, some embodiments may combine 10 or 100 PDCP SDUs into one virtual PDCP SDU.

In some embodiments, other than the PDCP concatenation at the PDCP sublayer, the L2 processing 200 may be similar to legacy L2 processing.

In some embodiments, PDCP procedures that rely on the PDCP SDU may need to be based on the virtual PDCP SDU. Additionally/alternatively, an intermediate SDU translation step may be introduced in 3GPP TSs.

PDCP concatenation may be configurable based on a number of aspects. For example, PDCP concatenation may be enabled for specific DRBs, directions (UL or DL), or traffic type (for example, XR, cloud gaming, TCP ACK, multicast-broadcast service (MBS), small data transmissions, etc.). In some embodiments. UE capability signaling with respect to PDCP or SDAP concatenation may be introduced.

A receiving entity may identify a PDCP PDU that includes a virtual PDCP SDU in various manners. For example, embodiments include providing an indication in a PDCP header, relying on IP packet inspection, which is already required for RoHC, to identify the virtual PDCP SDU; or upper layer packet inspection such as for non-IP PDU sessions of type Ethernet or unstructured. IP or non-IP packet inspection may still benefit from including at least one bit in a PDCP header to indicate whether a PDCP PDU is concatenated.

Figure 3:
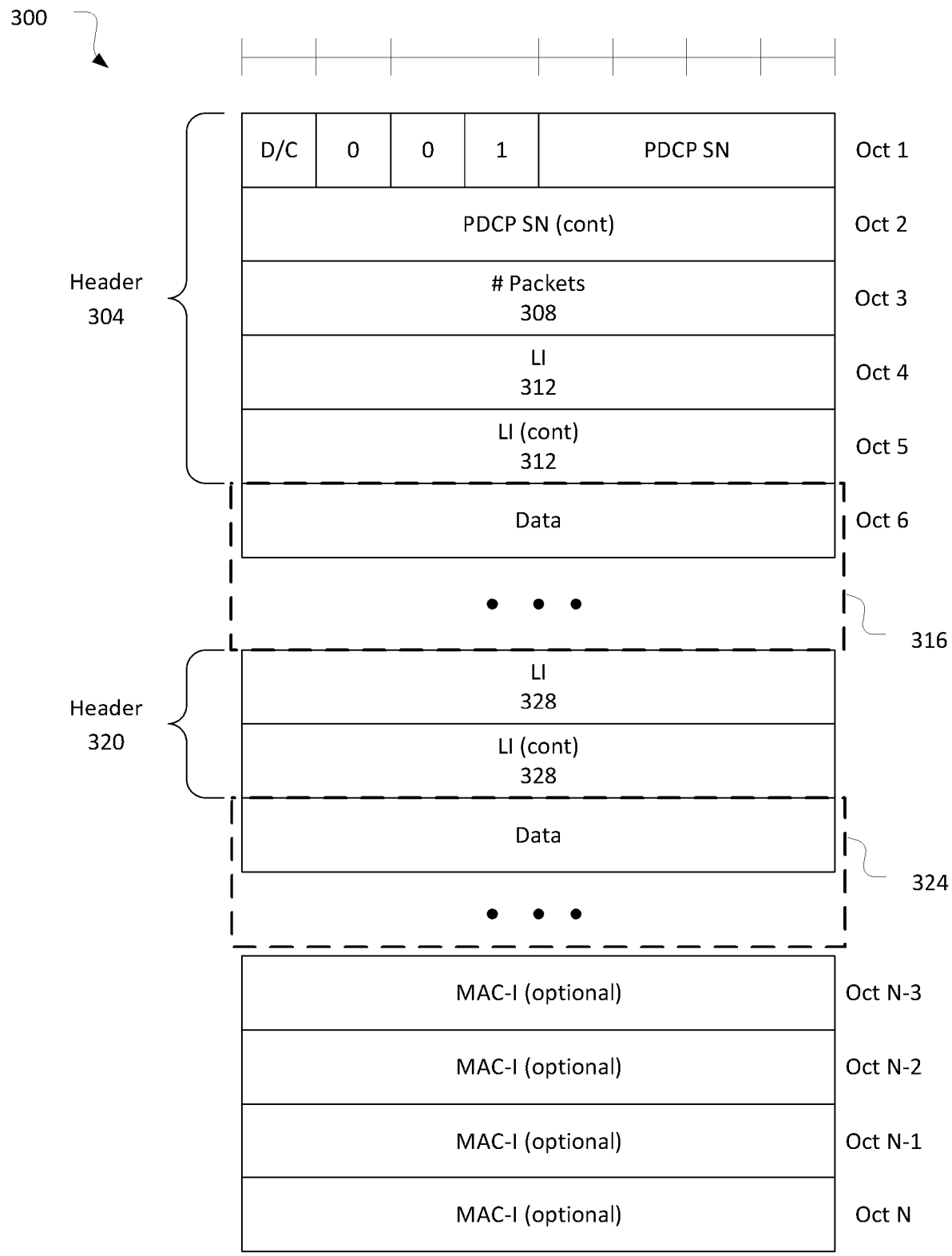
FIG. 3 illustrates a PDCP protocol data unit (PDU) in accordance with some embodiments.

FIG. 3 illustrates a PDCP PDU 300 in accordance with some embodiments. The PDCP PDU 300 may include a header 304 that provides information that allows a receiving entity to determine that the PDCP PDU 300 includes concatenated PDCP SDUs.

Bit 0 of octet 1 is a bit to indicate whether the PDCP PDU 300 carries data, for example, is a PDCP data PDU, or control, for example, is a PDCP control PDU.

Bits 1-3 of octet 1 are reserved bits in legacy PDCP headers. The reserved bits may be used to define a concatenation type. For example, 000 may indicate that the header 304 is a normal PDCP data PDU header, while 001 indicates that the header 304 is a concatenated PDCP data PDU header. In other embodiments, bits 1-3 may be used as a field to identify the various PDCP concatenation parameters as discussed elsewhere herein.

In some instances, there may be more than three reserved bits, for example, PDCP Data PDU format for DRBs with 18 bits PDCP SN may have five reserved bits in octet 1. Thus, the bit values of PDCP PDU 300 (for reserved bits, SN bits, or otherwise) is shown merely as an example and is not restrictive.

The header 304 as shown may be a concatenated PDCP data PDU header with a packet number field (#Packets) 308 that indicates a number of PDCP SDUs that have been concatenated into the PDCP PDU 300. The packet number field 308 may be one octet, for example, octet 3, in some embodiments. The header 304 may also include a length indication field (L1) 312 to indicate a size of each PDCP SDU. The length indication field 312 may be two octets, for example, octet 4 and octet 5, in some embodiments.

In the event that all concatenated PDCP SDUs are of the same length, a single length indication field 312 may be sufficient. Thus, in this case, the packet number field 308 may not be needed. However, the packet number field 308 may provide additional flexibility by, for example, allowing the PDCP PDU 300 to include PDCP SDUs of different sizes.

In some embodiments, the size of the PDCP SDUs may be a pre-configured fixed size. In these embodiments, the length indication field 312 may not be needed.

The length indication field 312 may be followed by a data field that includes a virtual PDCP SDU with a plurality of concatenated PDCP SDUs.

In some embodiments, the PDCP PDU 300 may include a second header portion, for example, header 320, to define aspects of a second virtual PDCP SDU 324 of the PDCP PDU 300. The header 320 may include a length indication field 328 to indicate a size of each PDCP SDU in the virtual PDCP SDU 324.

The PDCP PDU 300 may include a MAC-I to perform integrity protection. As shown, the MAC-I is four bytes.

In some embodiments, RRC configurations may be used to control aspects of PDCP concatenation, for example, RRC configurations may limit the applicability of PDCP SDU concatenation to certain situations. The following RRC parameters may be communicated through RRC configurations, for example, RRC information elements, in various embodiments.

A first parameter may indicate a maximum number of PDCP SDUs that can be concatenated in one PDCP PDU. In some embodiments, variations of this configuration parameter may provide more granularity. For example, an RRC parameter may indicate how many virtual PDCP SDUs may be included in a PDCP PDU, or how many PDCP SDUs may be included in a virtual PDCP SDU.

A second parameter that may be configured by RRC may indicate a maximum size of a concatenated PDCP PDU. This may correspond to the size of all virtual PDCP SDUs and headers included in the PDCP PDU. Additionally/alternatively, a maximum size of a virtual PDCP SDU may be configured.

A third parameter that may be configured by RRC may indicate a maximum size of a single PDCP SDU that can be concatenated. In some instances, this parameter may be derived from the first and second parameter, but may provide for additional flexibility. The third parameter may be desirable in the situation in which a PDCP PDU includes PDCP SDUs of different sizes.

A fourth parameter that may be configured by RRC may indicate direction and enablement where PDCP SDU concatenation may be applied. For example, the fourth parameter may indicate that PDCP SDU concatenation may be applied in the downlink only, in the uplink only, or in both the uplink and downlink.

In some aspects of the disclosure, a DRB may be configured with a threshold that may be used for PDCP concatenation. For example, if a PDCP SDU smaller than a typical maximum transmission unit (MTU) by a threshold, the transmitter may apply concatenation in the PDCP sublayer. The MTU may be configured by the network.

The configuration parameters described are optional and may not be used in all embodiments. Further, one or more of the configuration parameters may be used in connection with other configuration parameters or with fixed, predefined, configurations. For example, a fixed rule may be added to the 3GPP TSs that define PDCP or RRC operations that enables the device to identify how to derive a maximum size and number of PDCP SDUs that may be concatenated, or whether a maximum size of a concatenated PDCP PDU is to be limited (for example, to a PDCP SDU size of 9,000 bytes or to one of a small set of predefined values).

Network configuration of where and how concatenation is to be applied may be based on a UE capability for SDU concatenation. The UE 104 may provide the base station 108 with an indication of its capability for SDU concatenation in UE capability signaling. The base station 108 may then determine and provide the appropriate concatenation configurations for the UE 104 by RRC.

Figure 4:
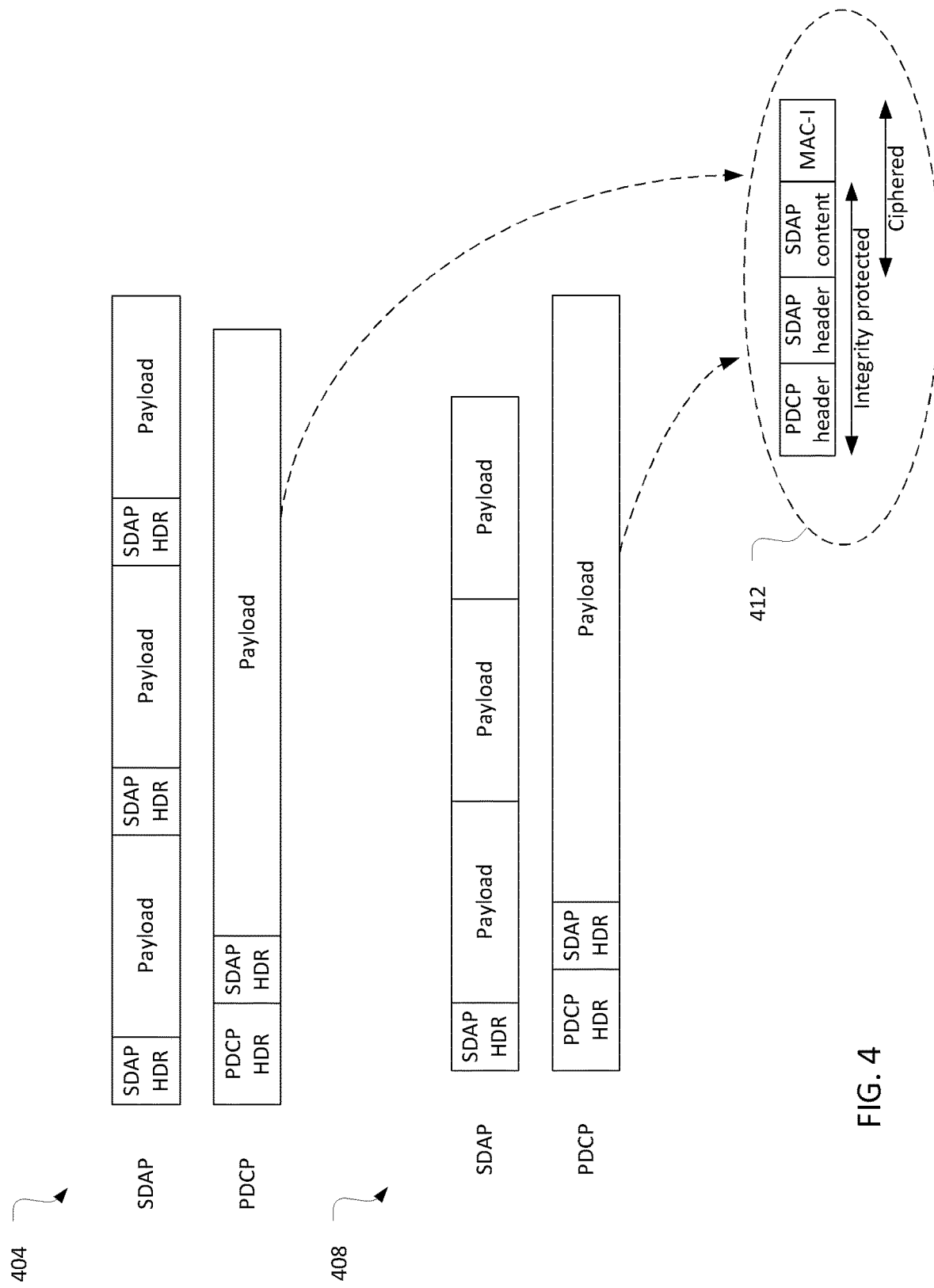
FIG. 4 illustrates variants of PDCP concatenation in accordance with some embodiments.

FIG. 4 illustrates variants of PDCP concatenation in accordance with some embodiments. In particular, FIG. 4 illustrates a first PDCP concatenation variant 404 and a second PDCP concatenation variant 408. The variants 404/408 reduce overhead in L2 processing by associating only one SDAP header per concatenated PDCP SDU. This may imply that only PDCP SDUs of the same QFI are concatenated within a PDCP PDU. A separate SDAP header may not be needed for each of the PDCP SDUs. If SDAP sublayer produces the header, the PDCP sublayer may not need to include it.

With variant 404, the PDCP sublayer may remove SDAP headers when performing the concatenation. With variant 408, the SDAP sublayer may produce only one SDAP header that corresponds to all three SDAP payloads. In both variants, all of the SDAP headers may include the same content. Therefore, only one SDAP header may be needed for the three SDAP payloads.

Reducing the number of SDAP headers may improve the efficiency of ciphering and integrity protection operations of the PDCP sublayer. For example, as illustrated by the PDCP PDU 412, which may be generated based on variant 404 or variant 408, integrity protection may be performed over the PDCP header, SDAP header, and SDAP content, while ciphering may be based on the SDAP content and a corresponding MAC-I. Thus, complexity of the ciphering and integrity protection operations may be reduced by removing redundant SDAP headers. Thus, integrity protection may only need to be performed with respect to one SDAP header, and the SDU content upon which the ciphering is based may not need to be parsed for header/payload boundaries.

In some options, the PDCP SDUs that may be combined in a concatenated PDCP PDU may be based on a sequence of the PDCP SDUs. For example, PDCP SDUs may be concatenated in sequence based on IP/non-IP (upper layer) packets. In-sequence operation may be configured by RRC or assumed when RoHC is active.

Additionally/alternatively, a set of PDCP SDUs that are to be concatenated are defined based on a reflective QoS setting, for example, a reflective quality of service (QoS) indication (RQI) or reflective QoS flow to data radio bearer mapping indication (RDI). For example, for PDCP SDUs with a common QFI, if a SDAP header of the PDCP SDU has a RQI/RDI bit set to indicate an update to a quality of service parameter (for example, an update to a QoS rule, a reflective QoS (RQ) timer, or a QoS flow-to-DRB mapping), then the selection of PDCP SDUs to be concatenated into a PDCP PDU may terminate, whether or not a maximum number of PDCP SDUs that may be concatenated has been reached. The PDCP SDU that has the header with the RQI/RDI bit set may be concatenated with one or more additional PDCP SDUs in a subsequent PDCP PDU. In some embodiments, selecting PDCP SDUs for concatenation in this manner may be optional and may depend on network implementation.

In some embodiments, to reduce the overhead in L2 processing, the concatenation options may be preconfigured in a fixed manner. This may allow for the PDCP header to be reduced as the concatenation parameters may not need to be communicated in the header.

The PDCP (or a DRB) may be (pre-)configured with one or more of the following options.

In a first option, the PDCP (or a DRB) may be (pre-)configured with a number of packets (of the same size) that are to be concatenated along with a maximum length indicator; or a set of fixed concatenation conditions that may always be active.

In a second option, a flexible multidimensional lookup table may be (pre)configured. The table may include sets of parameters that respectively correspond to unique values or identifiers, which may be signaled in one or more bits of the PDCP header. The PDCP header may include a value/identifier that points to a set of parameters in the lookup table. The parameters may include, for example, a number of PDCP SDUs that may be in one concatenated PDCP PDU; a size of each PDCP SDU; a size of the concatenated PDCP PDU; an uplink/downlink direction in which PDCP concatenation is enabled, etc. In some embodiments, a hash function may be used to link an identifier (for example, a hash value/label) in the header with a set of parameters in the lookup table.

In a third option, RRC (or another layer) may define a number of concatenation patterns, where each pattern may include, for example, a specific size of a concatenated PDCP PDU along with a specific number of PDCP SDUs or other concatenation parameters. The PDCP header may have a field with a value that identifies the pattern number. The size of the header field may depend on a number of patterns that are defined. For example, if there are three patterns defined, the header field may include two bits to provide an identifier of one of the three patterns. In this example, a setting of 0b00 may indicate that PDCP concatenation is not active.

In a fourth option, to accommodate a fixed set of concatenation parameters at varying radio conditions, PDCP concatenation may be activated/deactivated through a new field in downlink control signaling. The downlink control signaling may be transmitted from the base station 108 to the UE 104 through downlink control information (DCI) or a MAC control element (CE).

Figure 5:
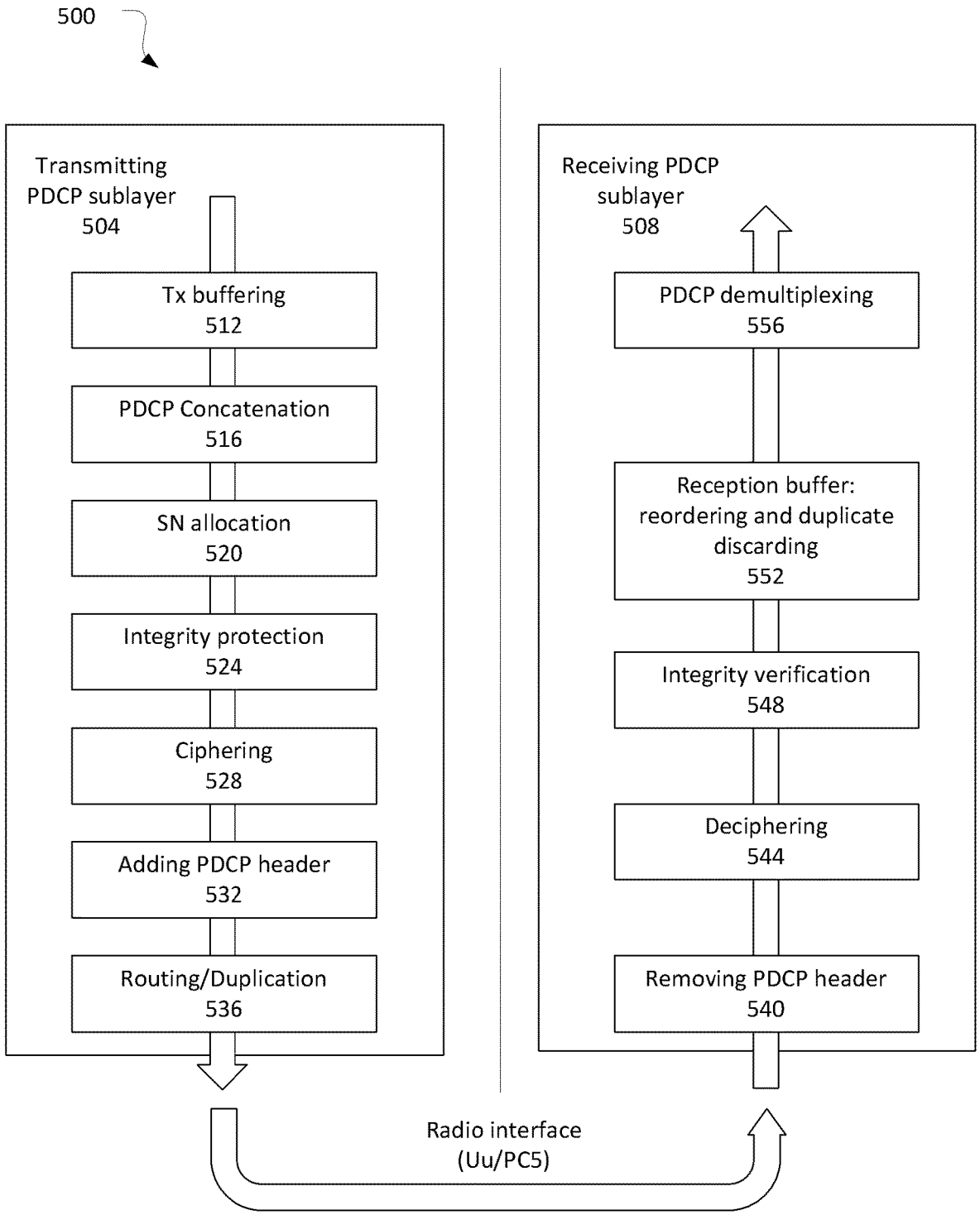
FIG. 5 illustrates a first PDCP architecture in accordance with some embodiments.

FIG. 5 illustrates a first PDCP architecture 500 that may be used for PDCP concatenation in accordance with some embodiments. The PDCP architecture 500 may include a transmitting PDCP sublayer 504 to perform PDCP concatenation, and a receiving PDCP sublayer 508 to perform PDCP demultiplexing. The transmitting PDCP sublayer 504 may be in the UE 104 or the base station 108. Similarly, the receiving PDCP sublayer 508 may be in the UE 104 or the base station 108.

The transmitting PDCP sublayer 504 and the receiving PDCP sublayer 508 may have circuitry to perform a number of operations, some of which will be described herein. Unless otherwise described, the operations performed by the transmitting PDCP sublayer 504 and the receiving PDCP sublayer 508 may be similar to like-named operations described in 3GPP TS 38.323 v16.4.0 (2021 June).

The transmitting PDCP sublayer 504 may provide transmit (Tx) buffering 512 by storing packets received from a higher sublayer, for example, an SDAP layer, in a transmit buffer.

The transmitting PDCP sublayer 504 may further provide PDCP concatenation 516 by assembling a plurality PDCP SDUs, which correspond to the packets from upper layers, into a virtual PDCP SDU. PDCP concatenation may be performed when various conditions described herein are met.

After PDCP concatenation 516, the transmitting PDCP sublayer 504 may perform an SN allocation 520 by allocating a PDCP SN to the virtual PDCP SDU. One SN may be provided for each virtual PDCP SDU.

After the SN allocation 520, the transmitting PDCP sublayer 504 may perform integrity protection 524. The integrity protection 524 may be performed based on the virtual PDCP SDU. For example, the integrity protection 524 may be performed on an SDAP header and SDAP content included in the virtual PDCP SDU.

After the integrity protection 524, the transmitting PDCP sublayer 504 may perform ciphering 528. The ciphering 528 may also be performed based on the virtual PDCP SDU. For example, the ciphering 528 may be performed on the SDAP content and a MAC-I.

After the ciphering 528, the transmitting PDCP sublayer 504 may add a PDCP header 532 to the virtual PDCP SDU. The header may include information about concatenation of the virtual PDCP SDU.

After adding the PDCP header 532, the transmitting PDCP sublayer 504 may perform routing/duplication 536. The routing may be performed for split bearers and DAPS bearers. Duplication may be performed for DRBs when the transmitting PDCP sublayer 508 this configured with a PDCP duplication information element (for example, pdcp-Duplication).

The PDCP PDU may be provided to lower layers (for example, RLC sublayer and below) and transmitted over a radio interface (Uu/PC5).

The PDCP operations performed by the transmitting PDCP sublayer 504 may not include header compression such as RoHC that compresses IP, RTP, and TCP headers based on RoHC compression configurations. Given that the concatenation is performed on the non-header compressed packets, and a compression profile may not be applicable to multiple PDCP SDUs, the header compression may simply be disabled.

Receiving PDCP sublayer 508 may remove the PDCP header at 540. During removal of the PDCP header, the receiving PDCP sublayer 508 may identify whether the PDCP PDU carries a virtual PDCP SDU or a legacy PDCP SDU. In the event the receiving PDCP sublayer 508 receives the virtual PDCP SDU, the concatenation parameters may also be determined.

The receiving PDCP sublayer 508 may perform deciphering 544 on the SDAP content and MAC-I of the virtual PDCP SDU, and may perform integrity verification 548 on the SDAP header and SDAP content.

After the integrity verification 548, the receiving PDCP sublayer 508 may perform reordering and duplicate discarding 552. The PDCP reordering may be done based on the SN that is associated with the virtual PDCP SDU. The reordered virtual PDCP SDUs may be stored in a reception buffer.

The receiving PDCP sublayer may perform PDCP demultiplexing 556 on the virtual PDCP SDU in the reception buffer in order to derive the PDCP SDUs that correspond to upper layer packets. Information obtained from the PDCP header may assist in deriving the PDCP SDUs from the virtual PDCP SDU as described herein.

After the PDCP demultiplexing 556, the receiving PDCP sublayer 508 may provide the PDCP SDUs to an upper sublayer, for example, an SDAP layer.

Figure 6:
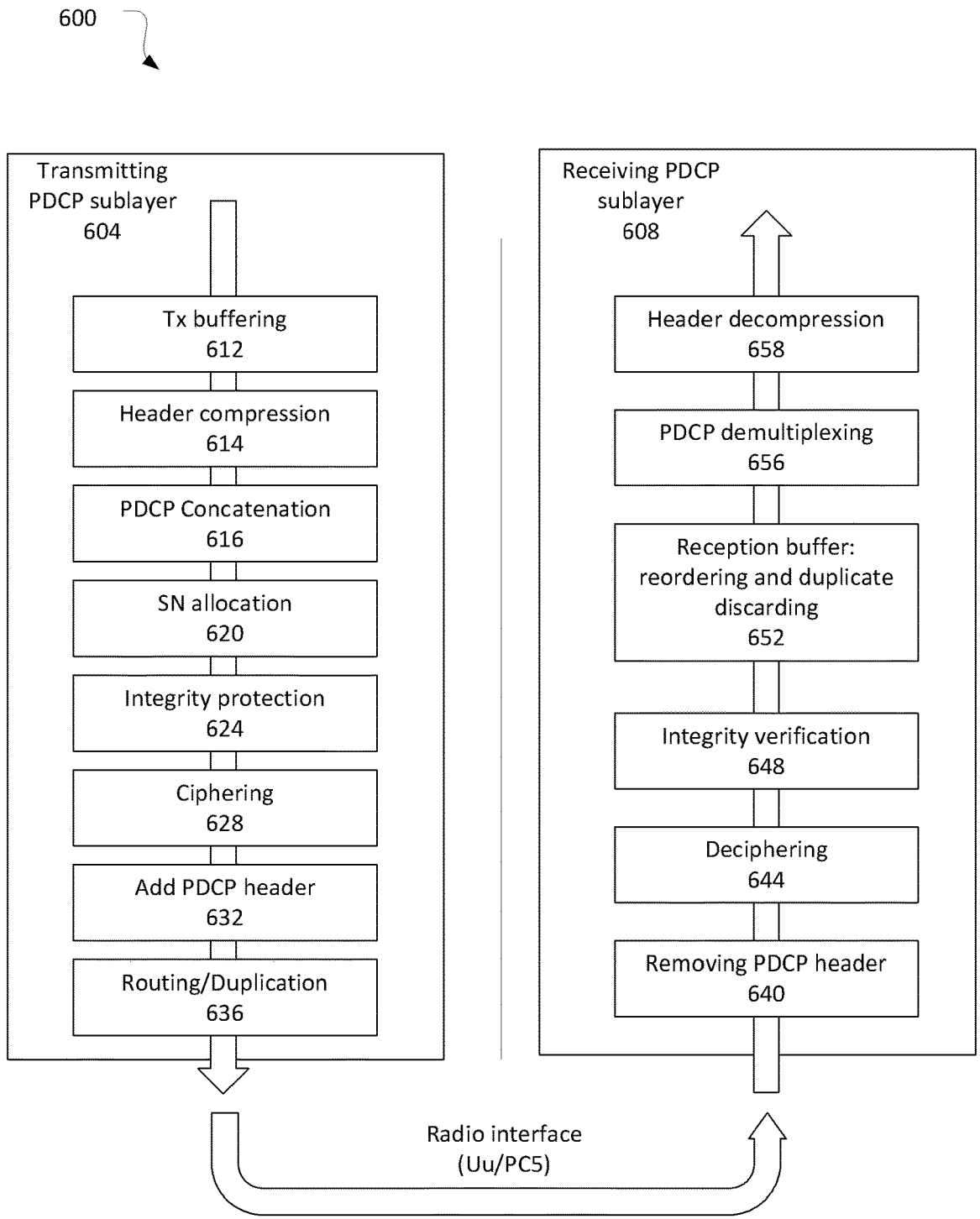
FIG. 6 illustrates a second PDCP architecture in accordance with some embodiments.

FIG. 6 illustrates a second PDCP architecture 600 that may be used for PDCP concatenation in accordance with some embodiments. The PDCP architecture 600 may include a transmitting PDCP sublayer 604 to perform PDCP concatenation, and a receiving PDCP sublayer 608 to perform PDCP demultiplexing. The transmitting PDCP sublayer 604 may be in the UE 104 or the base station 108. Similarly, the receiving PDCP sublayer 608 may be in the UE 104 or the base station 108.

The transmitting PDCP sublayer 604 may perform operations similar to like-named operations described above with respect to transmitting PDC sublayer 504. In particular, the transmitting PDCP sublayer 604 may perform transmit buffering 612, PDCP concatenation 616, SN allocation 620, integrity protection 624, ciphering 628, adding PDCP header 632, and routing/duplication 636 similar to that described above with respect to transmitting PDCP sublayer 504. However, in this embodiment, the transmitting PDCP sublayer 604 may also perform header compression 614 after transmit buffering 612. The header compression 614 may be performed on the PDCP SDUs that correspond to the upper layer packets. The header compression 614 may include RoHC that compresses IP, RTP, and TCP headers within the PDCP SDUs based on RoHC compression configurations.

After the header compression 614, the PDCP concatenation 616 may assemble the PDCP SDUs, with compressed headers, into a virtual PDCP SDU.

The receiving PDCP sublayer 608 may perform operations similar to like-named operations described above with respect to receiving PDC sublayer 608. In particular, the receiving PDCP sublayer 608 may perform removing PDCP header 640, deciphering 644, integrity verification 648, reordering and duplicate discarding 652, and PDCP demultiplexing 656 similar to that described above with respect to receiving PDCP sublayer 508. However, after the PDCP SDUs are recovered from the PDCP demultiplexing 656, the receiving PDCP sublayer 608 may perform header decompression 658 to decompress the IP, RTP, or TCP headers that were compressed at header compression 614.

The PDCP PDU header may be provided with information to help the receiving PDCP sublayer identify whether to perform the PDCP demultiplexing. For example, a field in the header may indicate whether the PDCP PDU includes a virtual PDCP SDU (with more than one PDCP SDUs) or one PDCP SDU.

In the event the PDCP PDU includes the virtual PDCP SDU, additional information may be provided in a header of the virtual PDCP SDU to assist the receiving PDCP sublayer in demultiplexing the virtual PDCP SDU to derive each PDCP SDU/upper layer packet. In some embodiments, a header of the virtual PDCP SDU may include a number of concatenated packets, which may correspond to complete PDCP SDUs as segmentation may not be used as part of the concatenation process; and a length of each concatenated packet.

In some embodiments, the network may provide some restrictions on the concatenated PDCP SDU. This may improve the efficiency of signaling the concatenation information in the headers.

Figure 7:
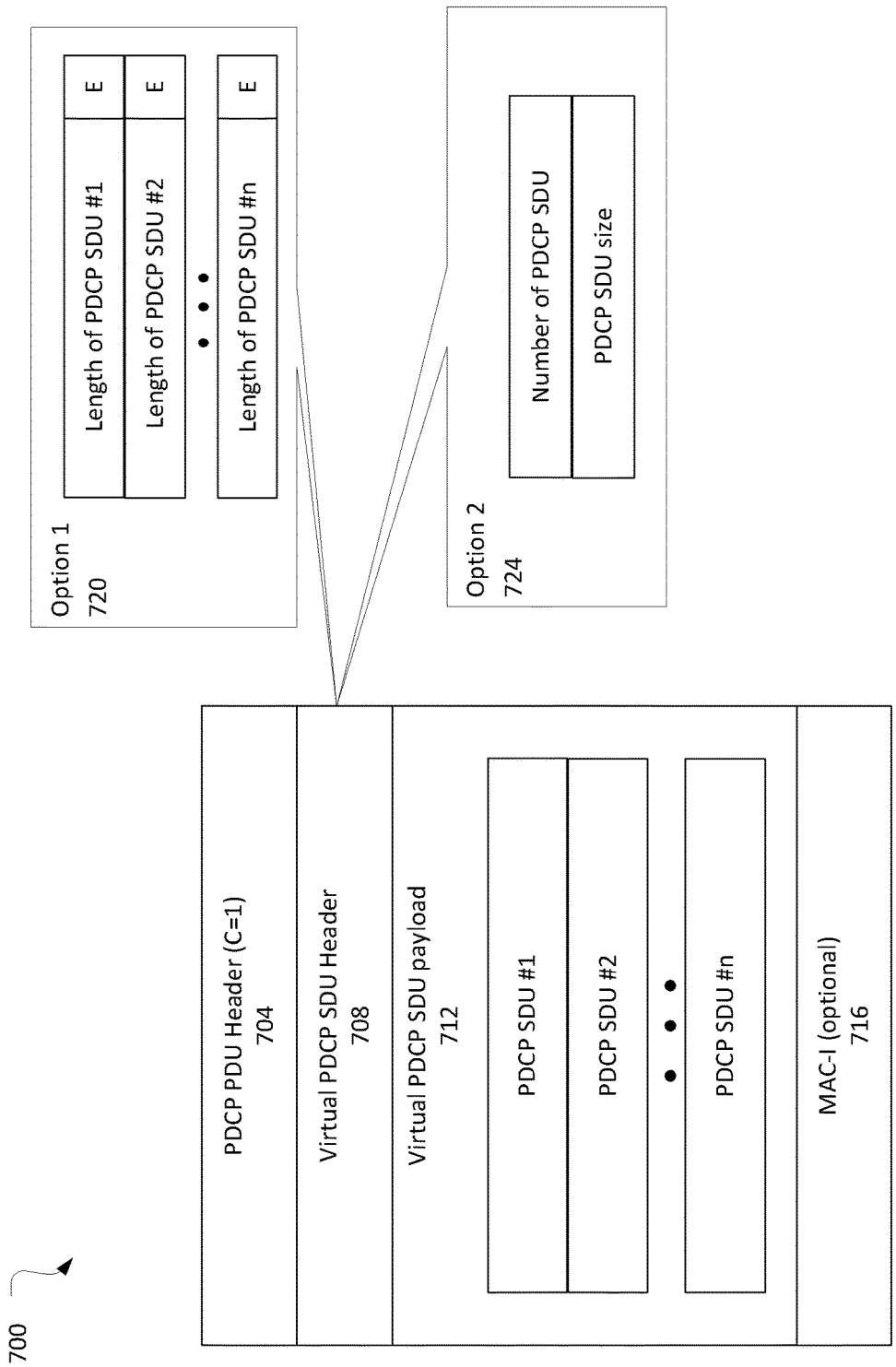
FIG. 7 illustrates a PDCP PDU in accordance with some embodiments.

FIG. 7 illustrates a PDCP PDU 700 in accordance with some embodiments. The PDCP PDU 700 may include a PDCP PDU header 704, a virtual PDCP SDU header 708, a virtual PDCP SDU payload 712, and an optional MAC-I 716. The virtual PDCP SDU payload 712 may include n PDCP SDUs.

The PDCP PDU header may include a field with a value (for example, C=1) that indicates the PDCP PDU 700 includes a virtual PDCP SDU.

The virtual PDCP SDU header may include concatenation information in one or more fields to assist in demultiplexing the virtual PDCP SDU to derive PDCP SDUs #1-#n. The concatenation information may be conveyed according to option 1 720 or option 2 724.

In option 1 720, the concatenation information may indicate a size of each PDCP SDU included in the virtual PDCP SDU. For example, the concatenation information may include a length of PDCP SDU #1, a length of PDCP SDU #2, . . . a length of PDCP SDU #n.

In option 2 724, the concatenation information may indicate a number of PDCP SDUs included in the virtual PDCP SDU and a PDCP SDU size. With this option, the PDCP SDU size may apply to the PDCP SDUs of the virtual PDCP SDU payload 712. In some embodiments, the PDCP SDU size may be fixed by a network configuration, in which case, only the number of PDCP SDUs may need to be indicated.

In a third option, no explicit concatenation information may be carried in the virtual PDCP SDU header. Rather, the network may configure both a fixed PDCP SDU size and number.

In some embodiments, various conditions may be defined in which PDCP concatenation is activated or deactivated. As described above, one benefit of PDCP concatenation is a reduction in L2 overhead. However, if the PDCP concatenation sizes too large to segment in the RLC sublayer, the benefit may be reduced. Thus, in some instances, the benefit may be most applicable for transmissions of multiple small data packets within a short period of time. Infrequent data transmission, or transmitting packets with large sizes, may not benefit from the PDCP concatenation. For options for conditions in which PDCP concatenation is to be activated are provided below.

In a first option, PDCP concatenation may be based on a timer. For example, only packets received from the SDAP within a configured period of time may be concatenated together. For example, a transmitting PDCP sublayer may start a timer upon receiving a packet from the SDAP sublayer. If additional packets are received before the timer expires, the transmitting PDCP sublayer may perform PDCP concatenation on the first packet and any additional packets that were received before the timer expires. PDCP concatenation may be limited based on other conditions such as, for example, size or number of PDCP SDUs that may be concatenated.

In a second option, PDCP concatenation may be based on the PDCP SDU/packet size. For example, only packets with a size the same as or smaller than a configured packet size may be considered for PDCP concatenation. If the transmitting PDCP sublayer determines a packet size greater than the configured packet size, it may perform a legacy behavior (for example, forming a PDCP PDU with one PDCP SDU).

In a third option, PDCP concatenation may be based on a virtual PDCP SDU size or mini uplink grant size. For example, a virtual PDCP SDU size may be limited to be not larger than a configured threshold size. A transmitting PDCP sublayer may assemble PDCP SDUs into a virtual PDCP SDU as long as the resulting virtual PDCP SDU does not exceed the configured threshold size. In some embodiments, the configured threshold size may correspond to the PDCP PDU that includes one or more virtual PDCP SDUs.

In a fourth option, PDCP concatenation may be based on a radio quality. For example, PDCP concatenation may be disabled when a radio quality is less than a preconfigured threshold. Under bad radio conditions the base station may add a lot of error protection at PHY level and/or limit the available power. Therefore, the number of bytes that can be accommodated in a MAC PDU is typically smaller in such conditions as the network may not provide a large MAC PDU size for transmission. For example, the UE may experience a small grant size at the cell edge (or in other conditions as well, for example congestion or when multiple other higher priority transmissions are to be served). If the final PDCP PDU is too large to be segmented in RLC, the benefit will disappear.

In some embodiments, a PDCP SDU discard mechanism may be defined for PDCP concatenation.

In legacy operation, a PDCP SDU discard timer is maintained per PDCP SDU to control a lifetime of each packet in an access stratum layer. A transmitting PDCP sublayer may start the discard timer when a PDCP SDU is received from an upper layer. When the discard timer expires for a PDCP SDU, or the PDCP SDU is successfully delivered as confirmed by a PDCP status report, the transmitting PDCP sublayer may discard the PDCP SDU. Embodiments describe two options for handling the discard timer for a virtual PDCP SDU.

In a first option, the discard timer may be maintained per virtual PDCP SDU. The transmitting PDCP sublayer may start the PDCP discard timer upon generation of the virtual PDCP SDU. Upon expiration of the discard timer, or if the virtual PDCP SDU is successfully delivered as confirmed by a PDCP status report, the transmitting PDCP sublayer may discard the virtual PDCP SDU and all the associated packets.

In a second option, the discard timer may be maintained per PDCP SDU similar to that described above with respect to legacy operation. For example, a transmitting PDCP sublayer may start the PDCP discard timer when a packet/ PDCP SDU is received from an upper layer. If a discard timer for a first PDCP SDU expires after the virtual PDCP SDU that carries the first PDCP SDU is delivered by lower layers, the transmitting PDCP sublayer may not discard the first PDCP SDU.

If the discard timer for a first PDCP SDU expires after a virtual PDCP SDU that carries the first PDCP SDU is generated, but before the virtual PDCP SDU is successfully delivered as confirmed by a PDCP status report, the transmitting PDCP sublayer may discard the first PDCP SDU. It may do this by discarding the virtual PDCP SDU (along with all of its PDCP SDUs) and regenerating the virtual PDCP SDU without the first PDCP SDU. Alternatively, the transmitting PDCP sublayer may keep the first PDCP SDU in the virtual PDCP SDU and mark it as discarded/invalid, or may replace it with padded bits that are not to be interpreted as an actual transmission by the receiving PDCP sublayer.

In some embodiments, PDCP SDU retransmission may be considered in conjunction with PDCP concatenation.

In a mobility event, a UE may change from being associated with a first base station to a second base station. The UE may then need to reestablish a PDCP entity that is connected with the second base station. When a PDCP acknowledgment mode (AM) entity is reestablished, a transmitting device may perform PDCP SDU retransmission in certain scenarios. For example, a transmitting device may (re)transmit all PDCP SDUs in ascending order of the COUNT values from a first PDCP SDU for which successful delivery of a corresponding PDCP data PDU was not confirmed. Embodiments describe how (re)transmission is to be handled in the case of virtual PDCP SDUs.

In some embodiments, when a PDCP AM entity is reestablished, for all the virtual PDCP SDUs that have not been delivered (or delivered but not confirmed), the transmitting entity may perform PDCP SDU retransmission according to the new configuration (for example, the configuration at the time the PDCP AM entity is reestablished with a). For example if the PDCP concatenation is not configured, the transmitting entity will perform legacy PDCP SDU retransmission.

In one option, a PDCP entity may not be configured with a PDCP status report (statusReportRequired) when the entity is configured with PDCP concatenation. If a virtual PDCP SDU transmitted with a first SN needs to be retransmitted, the retransmission of the virtual PDCP SDU may done with a new SN.

In a second option, a PDCP entity may be configured with a PDCP status report (statusReportRequired) when the entity is configured with PDCP concatenation. A PDCP entity configured with PDCP status report may allow a receiving device to received packets out of order, and the PDCP transmitting device may retransmit just the packets that are not successfully delivered. For a virtual PDCP SDU with a PDCP SN #X, when a fall back to a legacy PDCP SDU retransmission is indicated in a new cell, all the associated packets may use the same PDCP SN. However, the PDCP PDU header may include a sub-SN value to flag the packet order in the previous virtual PDCP SDU.

Figure 8:
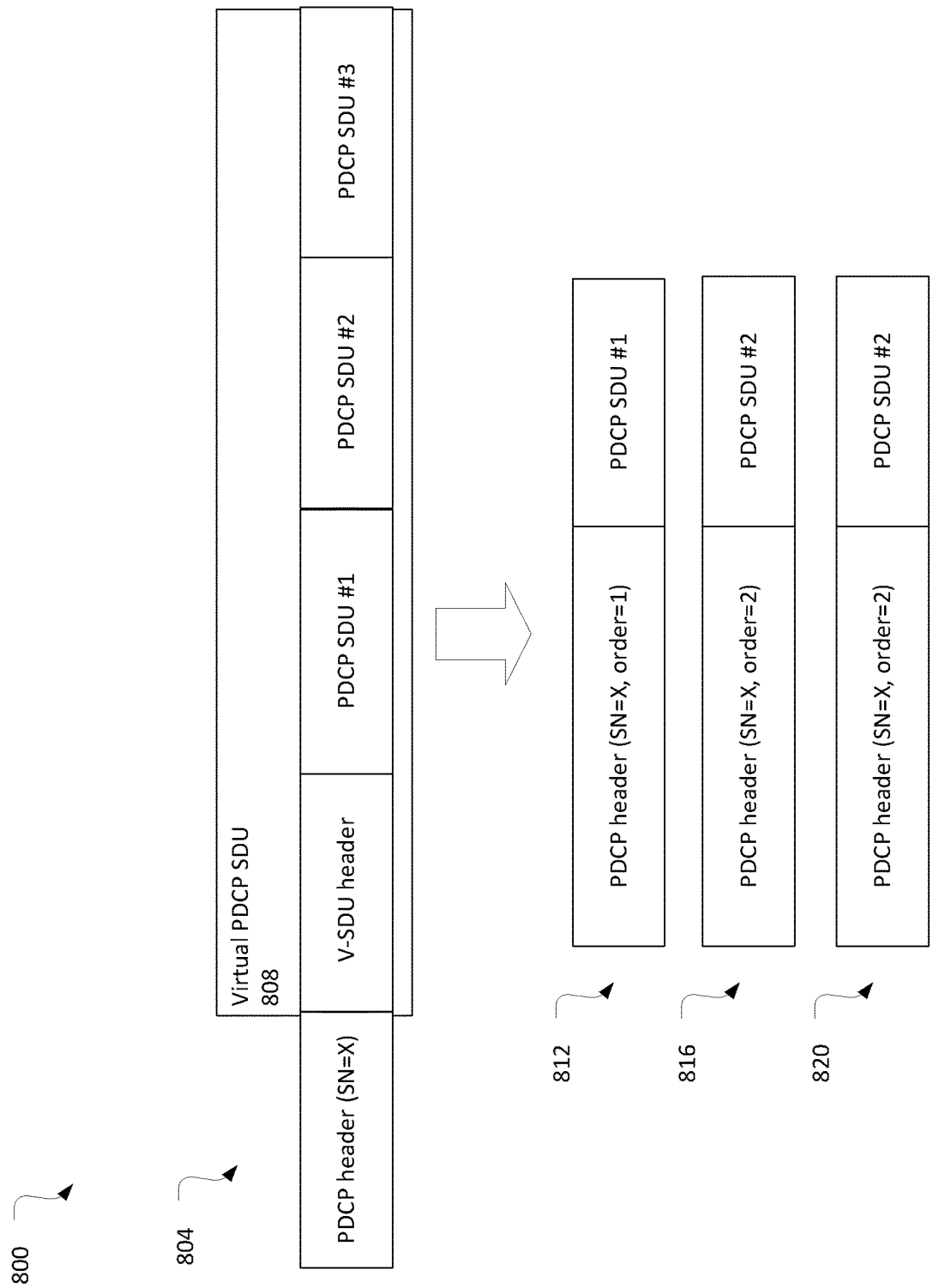
FIG. 8 illustrates a retransmission operation in accordance with some embodiments.

FIG. 8 illustrates a retransmission operation 800 in accordance with some embodiments.

Consider that in a first instance, a PDCP PDU 804 is transmitted with a PDCP header indicating SN=X. The PDCP PDU 804 may also include a virtual PDCP SDU 808 that includes a header (V-SDU header) and three PDCP SDUs, PDCP SDU #1-#3.

In the event a retransmission is needed, in which a fall back to legacy PDCP SDU retransmission is to be used, three PDCP PDUs may be generated, PDCP PDU 812, PDCP PDU 816, and PDCP PDU 820. Each of these PDCP PDUs may include a header that has SN=X, but they may also include order information. In particular, PDCP PDU 812 may have order=1 to indicate that its PDCP SDU was the first SDU in the virtual PDCP SDU 808; PDCP PDU 816 may have order=2 to indicate that its PDCP SDU was the second SDU in the virtual PDCP SDU 808; and PDCP PDU 820 may have order=3 to indicate that its PDCP SDU was the third SDU in the virtual PDCP SDU 808.

In some embodiments, data forwarding during handover between nodes may be addressed for PDCP concatenation.

During a handover, a source gNB may forward a UE's data to a target gNB in a DRB level. In the downlink, for all the packets without PDCP SN preservation, the source gNB may forward the QoS flow to the target gNB based on QoS flow-to-DRB mapping in the source gNB. For DRBs in which the preservation of SN status applies, the source gNB may forward the PDCP SDU with an SN corresponding to the PDCP PDU that has not been acknowledged by the UE to the target gNB. In the uplink, PDCP PDUs received out of sequence in the source gNB may or may not be forwarded to the target gNB. This may depend on whether out of sequence forwarding is enabled.

Various embodiments describe how to handle virtual PDCP SDU data forwarding during handover between base stations if PDCP concatenation is supported/configured.

In some embodiments, a unified solution for all possible PDCP concatenation configuration changes (for example, enable/disable or configuration parameter change) may be described.

In a first option, out-of-sequence data forwarding may not be enabled (for example, PDCP SDU with SN preservation may not be supported). All data transmitted via an X2/Xn interface is the PDCP SDU without SN allocation. Thus, a virtual PDCP SDU transmitted with a first SN may be retransmitted with a new SN.

In a second option, out-of-sequence data forwarding may be supported (for example, PDCP SDU without SN forwarding in X2/Xn interface). If both source and target gNBs support PDCP concatenation, for the X2/Xn interface, a virtual PDCP SDU flag may be added to the header of each packet to help a target gNB identify whether the packet includes a virtual PDCP SDU or legacy PDCP SDU.

If the source gNB enables PDCP concatenation and has a virtual PDCP SDU with an allocated SN for forwarding, but the target gNB does not support the PDCP concatenation, the transmitting device may not configure the PDCP status report (statusReportRequired) for the PDCP entity configured with PDCP concatenation, as described above, and may not support the out-of-sequence data forwarding.

While the above embodiments describe concatenating at the PDCP sublayer, other embodiments may include SDAP concatenation that happens directly at the SDAP sublayer level. The SDAP sublayer supports the following functions: mapping between a QoS flow and a data radio bearer; and marking QoS flow identifier (QFI) in both downlink and uplink packets.

Similar to PDCP concatenation, SDAP SDUs that are eligible to be concatenated with one another may have common QFIs. The SDAP header may include an extension with one or more additional octets in the SDAP data PDU. The concatenation information to enable SDAP concatenation may be conveyed in SDAP header fields, similar to that described above with respect to the PDCP header fields of FIG. 3, for example; or (pre)configured as described elsewhere with respect to PDCP concatenation. In these embodiments, the SDAP and not the PDCP may be configured for concatenation for a DRB; however, the principles of PDCP concatenation described herein may be applied to SDAP concatenation. All add-on components. RRC configurations, and additional options of PDCP concatenation may be applied to SDAP concatenation in a similar manner. Further, RRC may configure a set of concatenation options based on QFIs. For example, different QFIs may have different concatenation rules.

The presence of an SDAP header may be optional in 3GPP and may depend on specific requirements for a DRB such as a number of QoS flows in the uplink, 5GC-based network deployment, reflective QoS, etc. To account for the optional presence of the SDAP header, some embodiments describe SDAP concatenation even if the SDAP header is not configured or present. In a first option, PDCP concatenation and SDAP concatenation may be used in conjunction with one another. For example, SDAP concatenation may be used for DRBs in which an SDAP header is configured, and PDCP concatenation may be used for other DRBs. In a second option, the SDAP header may be included whenever concatenation is enabled at the SDAP level. For example, the SDAP header may be mandated when SDAP concatenation is active.

Advantages of SDAP concatenation may include not having to change the COUNT handling and not having to change PDCP handling.

Figure 9:
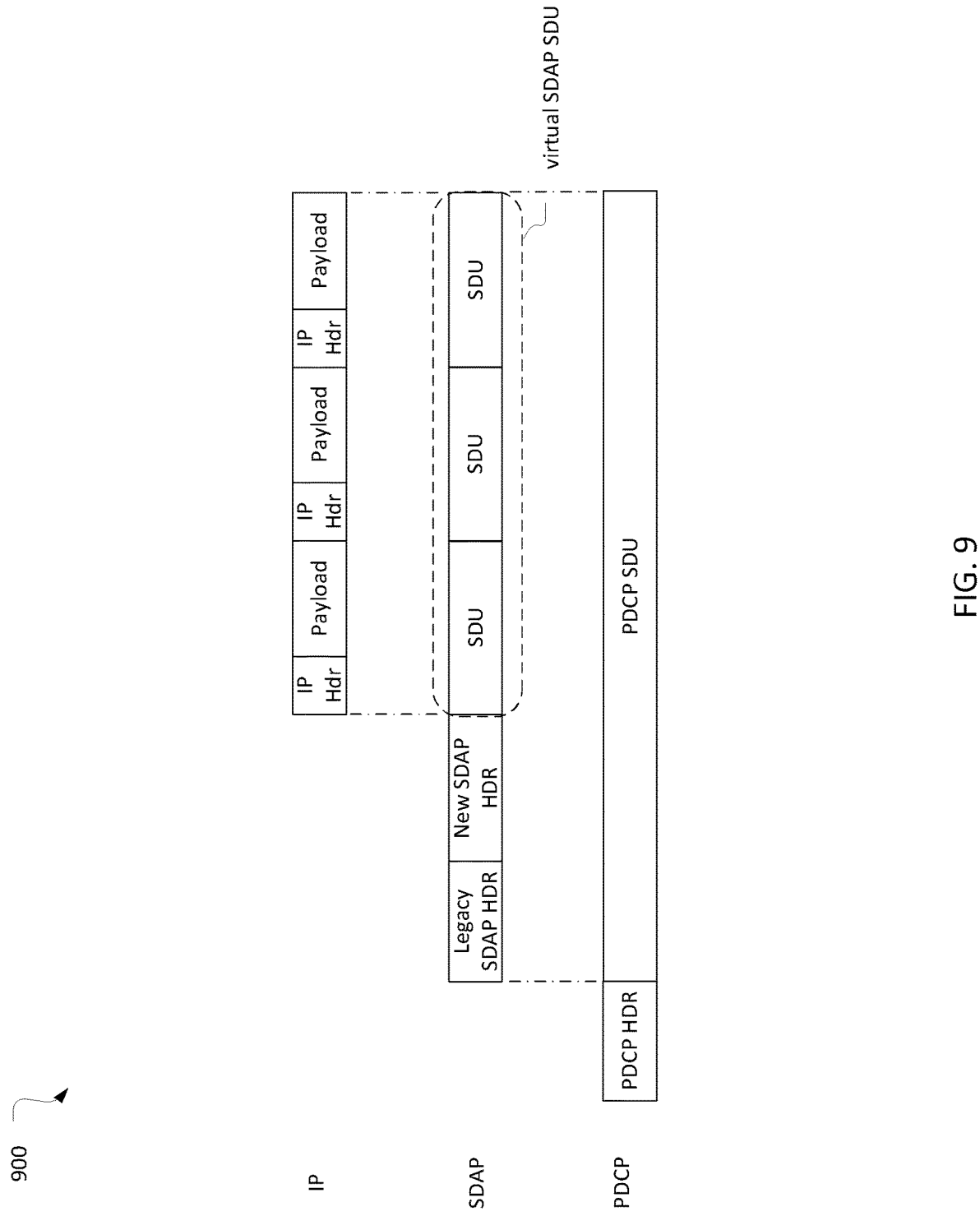
FIG. 9 illustrates SDAP concatenation in accordance with some embodiments.

FIG. 9 illustrates SDAP concatenation 900 in accordance with some embodiments. An IP sublayer may provide three packets, each having an IP header and a payload. Each packet may correspond to a SDAP SDU in the SDAP sublayer. The SDAP sublayer may generate a virtual SDAP SDU to include the three SDAP SDUs, which may all include the same QFI.

The SDAP sublayer may generate an SDAP PDU by providing a legacy SDAP header and a new SDAP header. The new SDAP header may include concatenation information that may facilitate a receiving entity in the processing of the virtual SDAP SDU to recover the individual SDAP SDUs.

The PDCP sublayer may receive the SDAP PDU as one PDCP SDU that includes the SDAP SDU content and SDAP headers. The PDCP sublayer may generate one PDCP PDU based on the one PDCP SDU consistent with legacy operation. The PDCP sublayer may perform ciphering/integrity based on the received PDCP SDU.

Additional aspects may be considered with respect to RQI and RDI bits in the SDAP header. Treatment of the RQI bit may be more relevant than the RDI bit for SDAP concatenation given that the RDI applies to QoS flow-to-DRB mapping. For example, if a QoS flow-to-DRB mapping is to be changed through reflective QoS, then there may be a new PDCP PDU in any event. However, the RQI bit may need to remain associated with the exact respective upper layer SDU for updating the QoS rule or RQ timer. Furthermore, it may be desirable to avoid losing the relationship between an original SDU, QFI, and RDI/RQI bit.

In a first option, given a list of SDUs that are to be concatenated at a transmitter, the SDUs may be concatenated for as long as the legacy SDAP header is the same (and a respective maximum number of SDUs has not been reached). The concatenation boundary may be determined based on the legacy SDAP header content (for example, QFI, RDI, or RQI) associated with a to-be-concatenated SDU changing in a manner that requires the QoS flow-to-DRB mapping, RQ timer, or QoS rule to be updated. For example, if legacy SDAP header content in SDU n changes in the above manner, SDU n−1 may be the last SDU included in a first virtual SDAP SDU, and SDU n may be the first SDU in a second virtual SDAP SDU. In this case, a number of SDAP SDUs in the first virtual SDAP SDU may be less than a configured maximum number of SDAP SDUs that may be concatenated into one virtual SDAP SDU.

In a second option, if the RQI bit associated with a to-be-concatenated SDU is set in a manner that would trigger an update of a QoS rule or a restart of the RQ timer while the QFI is the same, the new/extended SDAP header may include a new field to identify the exact SDU to be associated with the RQI setting for such a concatenated PDU. The exact SDU may be identified by an SDU order number.

In a third option, the RQI or RDI bit may be set in a single legacy SDAP header and the bit may apply to all concatenated SDUs in the same way. In this manner, the granularity of the RQI/RDI may be at the level of the concatenated PDU.

These three options may depend on network implementation of RQI/RDI. These options may also be applicable to PDCP concatenation in some embodiments.

In some embodiments, concatenation may be restricted to transmissions over certain interfaces between certain devices or network nodes.

In a first option PDCP/SDAP concatenation may be confined to the Uu interface between a UE and a base station or an integrated access and backhaul-mobile termination (IAB-MT) and an integrated access and backhaul-distributed unit (IAB-DU) in some embodiments.

In a second option PDCP/SDAP concatenation may be available to an F1 interface (between a gNB distributed unit (DU) and a gNB central unit (CU)), an E1 interface (between a CU control plane and a CU data plane), an X2 interface (between base stations), and an Xn interface (between gNB CUs). Thus communication over these interfaces may be performed using the sequence numbers of concatenated SDUs coming from the UE.

In some embodiments, the concatenated F1/E1/X2/Xn operation may be transparent if a terminating gNB also supports SDU concatenation. If one of the nodes does not support SDU concatenation, but the other does (for example, over the Uu interface), then the base station may need to support a translation function.

During a handover, it may be desirable for a source gNB to be aware of whether the target gNB supports concatenation if forwarding is used. If the target gNB supports concatenation, the source gNB may forward concatenated PDUs. If the target gNB does not support concatenation, the source gNB may need to forward un-concatenated (for example, legacy) PDUs only. Consider, for example, that a source gNB initially transmits a plurality of PDCP SDUs in a virtual PDCP SDU and later, determines the UE is handing over to a target gNB before determining that the virtual PDCP SDU was successfully delivered. If the target gNB supports concatenation, the source gNB may simply forward the virtual PDCP SDU to the target gNB. However, if the target gNB does not support concatenation, the source gNB may generate a plurality of PDCP PDUs that respectively incorporate the plurality of PDCP SDUs and transmit the plurality of PDCP PDUs to the target gNB consistent with legacy operation.

In some embodiments, SDU concatenation may be applied or specified in a manner that a given SDU concatenation configuration is only valid if it does not result in segmentation at lower layers. However, other embodiments may include full support of segmentation. For example, if an RLC retransmission is required in a grant size would lead to segmentation due to a different transport block size being available for the initial RLC transmission and the RLC retransmission, then segmentation may be allowed.

Figure 10:
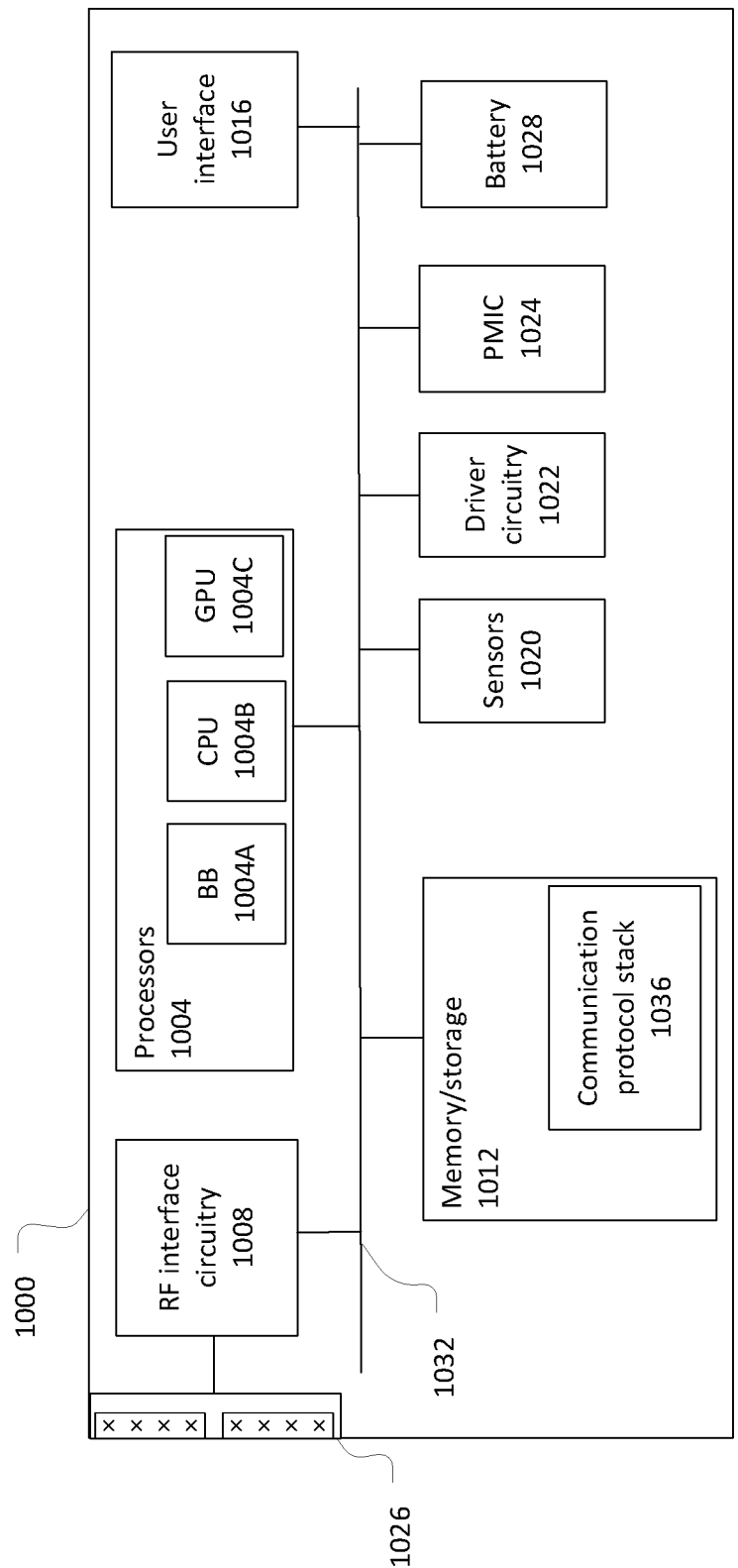
FIG. 10 illustrates a user equipment in accordance with some embodiments.

FIG. 10 illustrates a UE 1000 in accordance with some embodiments. The UE 1000 may be similar to and substantially interchangeable with UE 106 of FIG. 1.

The UE 1000 may be any mobile or non-mobile computing device, such as, for example, mobile phones, computers, tablets, XR devices, glasses, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, or optical connection that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack 1036 to: perform user plane functions at a PHY layer, MAC layer, RLC layer, PDCP layer, SDAP layer, and PDU layer, and perform control plane functions at a PHY layer, MAC layer, RLC layer, PDCP layer. RRC layer, and a NAS layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM). Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, or phased array antennas. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs). LED displays, quantum dot displays, and projectors), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
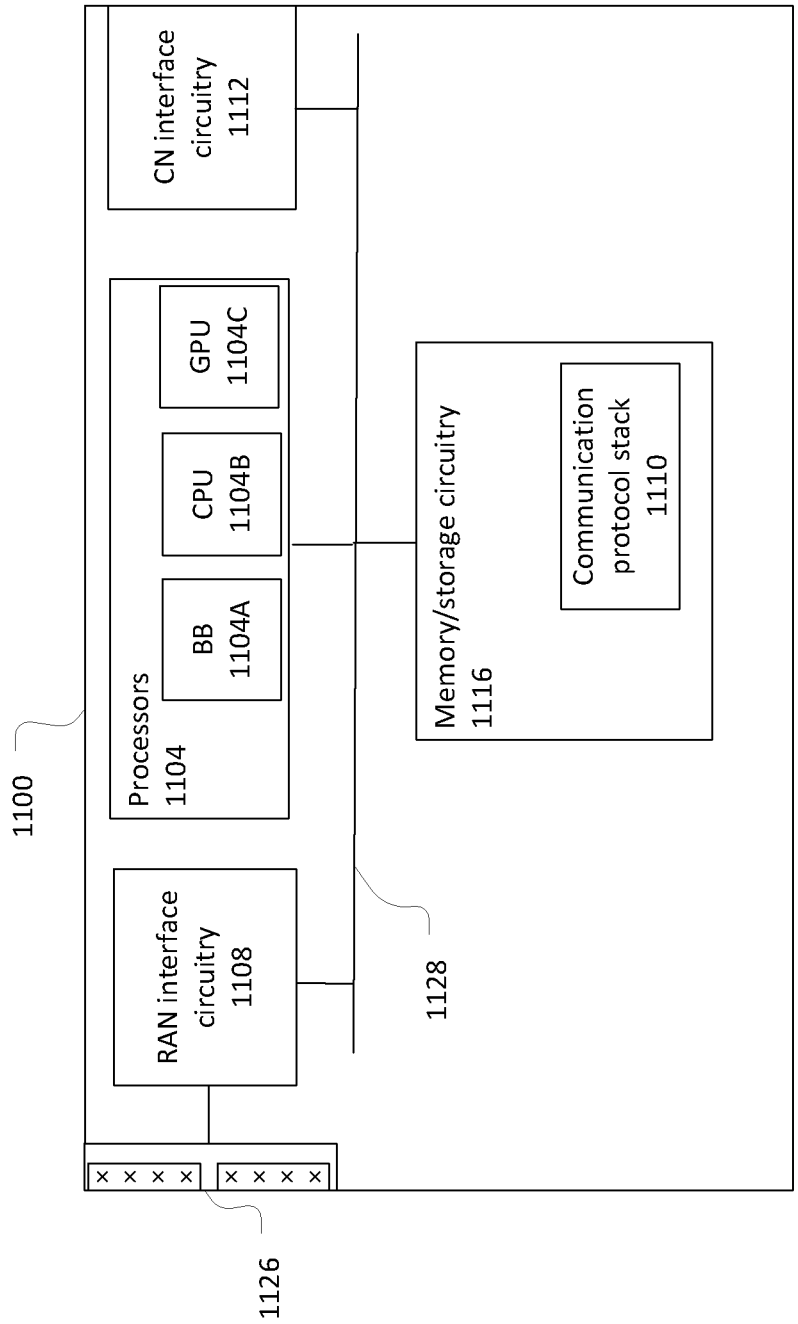
FIG. 11 illustrates a network device in accordance with some embodiments.

FIG. 11 illustrates a network device 1100 in accordance with some embodiments. The network device 1100 may be similar to and substantially interchangeable with base station 108 or a device of core network 112 of FIG. 1.

The network device 1100 may include processors 1104, RF interface circuitry 1108 (if implemented as a base station), core network (CN) interface circuitry 1112, memory/storage circuitry 1116, and antenna structure 1126 (if implemented as a base station).

The components of the network device 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10. If the device 1100 is implemented as a base station, the communication protocol stack 1110 may include access stratum layers. If the network device 1100 is implemented as a device in the core network 112, the communication protocol slack 1110 may include a NAS layer.

The CN interface circuitry 1112 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the base station 1100 may be coupled with transmit receive points (TRPs) using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method comprising: identifying a plurality of packet data convergence protocol (PDCP) service data units (SDUs); generating a PDCP packet data unit (PDU) to include the plurality of PDCP SDUs and a header with a field having a value to indicate that the PDCP PDU is concatenated; and providing the PDCP PDU to a radio link control (RLC) sublayer for transmission.

Example 2 includes a method of example 1 or some other example herein, wherein the header further comprises: a packet-number field having a value to indicate a number of PDCP SDUs in the PDCP PDU.

Example 3 includes the method of example 2 or some other example herein, wherein the header further comprises: a length field with a value to indicate a length of each of the number PDCP SDUs.

Example 4 includes the method of example 1 or some other example herein, wherein the plurality of PDCP SDUs comprises a first set of one or more PDCP SDUs and a second set of one or more PDCP SDUs and the header further comprises: a first packet-number field having a value to indicate a number of PDCP SDUs in the first set; a first length field having a value to indicate a length of each PDCP SDU of the first set of one or more PDCP SDUs; and a second length field having a value to indicate a length of each PDCP SDU of the second set of one or more PDCP SDUs.

Example 5 includes the method of example 4 some other example herein, wherein the header further comprises: a second packet-number field having a value to indicate a number of PDCP SDUs in the second set.

Example 6 includes a method of example 1 or some other example herein, further comprising: identifying a parameter that is preconfigured or signaled by a radio resource control (RRC) message that indicates a maximum number of PDCP SDUs that can be concatenated in one PDCP PDU; a maximum size of one PDCP PDU; a maximum size of a PDCP SDU that can be concatenated into one PDCP PDU; or an uplink or downlink direction in which concatenation of PDCP SDUs is permitted.

Example 7 includes the method of example 1 or some other example herein, further comprising: transmitting or receiving an indication of a PDCP concatenation capability of a user equipment.

Example 8 includes the method of example 1 or some other example herein, further comprising: identifying a plurality of service data adaptation (SDAP) PDUs, each SDAP PDU having a respective SDAP header and payload; determining that the plurality of SDAP headers have a common quality of service flow identifier; and generating, based on said determining, the plurality of PDCP SDUs to include one SDAP header and the plurality of payloads.

Example 9 includes the method of example 1 or some other example herein, further comprising: identifying a plurality of service data adaptation (SDAP) PDUs, each SDAP PDU having a common header and a respective payload; and generating, based on said determining, the plurality of PDCP SDUs to include the common header and the plurality of payloads.

Example 10 includes the method of example 1 or some other example herein, wherein the value provides an identifier and the method further comprises: accessing, based on the identifier, a lookup table or a number of predefined patterns to determine one or more concatenation parameters; and generating the PDCP PDU based on the one or more concatenation parameters.

Example 11 includes the method of example 1 or some other example herein, further comprising: receiving, in downlink control information or a media access control control element, an indication that PDCP concatenation is activated; and generating the PDCP PDU based on the indication.

Example 12 includes the method of example 1 or some other example herein, wherein the PDCP PDU is a first PDCP PDU, the plurality of PDCP SDUs is a first plurality of PDCP SDUs, and the method further comprises: identifying a second plurality of PDCP SDUs in a sequence, the second plurality of PDCP SDUs to include the first plurality of PDCP SDUs; determining a first PDCP SDU includes a reflective quality of service (QoS) indication (RQI) or reflective QoS flow to data radio bearer mapping indication (RDI) bit that indicates an update to a quality of service parameter; setting a second PDCP SDU that immediately precedes the first PDCP SDU in the sequence as a last PDCP SDU to be included in the first plurality of PDCP SDUs to be concatenated into the first PDCP PDU based on said determining; and generating a second PDCP PDU to include the first PDCP SDU and at least one additional PDCP SDU of the second plurality of PDCP SDUs.

Example 13 includes the method of example 1 or some other example herein, wherein the PDCP PDU is to be transmitted over: a Uu interface between a user equipment and a base station; an F1 interface between a gNB distributed unit (DU) and a gNB central unit (CU); an E1 interface between a CU control plane and a CU data plane; an X2 interface between base stations, or an Xn interface between gNB CUs.

Example 14 includes the method of example 1 or some other example herein, wherein the method is performed by a source base station, the PDCP PDU is to be transmitted to a user equipment (UE), and the method further comprises: determining the UE is being handed over to a target base station; determining whether the target base station supports concatenation; and forwarding the plurality of PDCP SDUs in the PDCP PDU or in a corresponding plurality of PDCP PDUs based on said determining whether the target base station supports concatenation.

Example 15 includes the method of example 1 or some other example herein, further comprising: determining concatenation of the plurality of PDCP SDUs would not result in lower-layer segmentation; and generating the PDCP PDU to include the plurality of PDCP SDUs based on said determining.

Example 16 includes the method of example 1 or some other example herein, further comprising: generating a concatenated PDCP SDU to include the plurality of PDCP SDUs; and performing ciphering and integrity protection on the concatenated PDCP SDU.

Example 17 includes a method comprising: identifying a plurality of service data adaptation (SDAP) service data units (SDUs); generating an SDAP PDU to include the plurality of SDAP SDUs and a header with a field having a value to indicate that the SDAP PDU is concatenated; and providing the SDAP PDU to a packet data convergence protocol (PDCP) sublayer for transmission.

Example 18 includes the method of example 17 or some other example herein, further comprising: determining the plurality of SDAP SDUs have a common quality of service flow identifier (QFI); and generating the SDAP PDU to include the plurality of SDAP SDUs based on said determining.

Example 19 includes the method of example 17 or some other example herein, wherein the header further comprises: a packet-number field having a value to indicate a number of SDAP SDUs in the SDAP PDU.

Example 20 includes the method of example 19 or some other example herein, wherein the header further comprises: a length field with a value to indicate a length of each of the number SDAP SDUs.

Example 21 includes the method of example 17 or some other example herein, further comprising: generating the SDAP PDU for a first data radio bearer (DRB) based on a determination that the first DRB is configured with SDAP headers; and generating a concatenated PDCP PDU for a second DRB based on a determination that the second DRB is configured without SDAP headers.

Example 22 includes the method of example 17 or some other example herein, wherein identifying the plurality of SDAP SDUs is based on a determination that the plurality of SDAP SDUs include a common header.

Example 23 includes the method of example 17 or some other example herein, wherein the field is a first field and the header further comprises a second field to identify an SDAP SDU of the plurality of SDAP SDUs that is associated with a reflective quality of service (QoS) indication (RQI) in the SDAP PDU.

Example 24 includes the method of example 17 or some other example herein, wherein the header is an extended header and the method further comprises: generating the SDAP PDU to include a legacy header with a reflective quality of service (QoS) indication (RQI) or reflective QoS flow to data radio bearer mapping indication (RDI) bit that applies to the plurality of SDAP SDUs.

Example 25 includes a method comprising: storing a plurality of packets received from a service data adaptation (SDAP) sublayer in a transmit buffer; identifying a plurality of PDCP service data units (SDUs) that respectively correspond to the plurality of packets; generating a virtual packet data convergence protocol (PDCP) SDU by concatenating the plurality of PDCP SDUs; allocating a sequence number (SN) to the virtual PDCP SDU; and generating a PDCP protocol data unit (PDU) with the virtual PDCP SDU and a header that includes an indication of the SN.

Example 26 includes the method of example 25 or some other example herein, further comprising: performing a header compression on one or more of the plurality of PDCP SDUs; and generating the virtual PDCP SDU after performing the header compression.

Example 27 includes the method of example 25 or some other example herein, wherein no header compression is performed on the plurality of PDCP SDUs.

Example 28 includes the method of example 25 or some other example herein, further comprising: performing integrity protection and ciphering on the virtual PDCP SDU.

Example 29 includes the method of example 25 or some other example herein, further comprising: generating the header to include an indication of a number of the plurality of PDCP SDUs; or a length of an individual PDCP SDU of the plurality of PDCP SDUs.

Example 30 includes the method of example 25 or some other example herein, further comprising: generating the header to include an indication of a length of each PDCP SDU of the plurality of PDCP SDUs.

Example 31 includes a method of example 25 or some other example herein, further comprising: receiving a first packet of the plurality of packets; starting a timer based on receiving the first packet; and identifying the plurality of PDCP SDUs to include PDCP SDUs that correspond to packets received before the timer expires.

Example 32 includes the method of example 25 or some other example herein, further comprising: receiving a configuration of a packet size; and identifying the plurality of PDCP SDUs to include PDCP SDUs having a size that is less than or equal to the packet size.

Example 33 includes the method of example 25 or some other example herein, further comprising: receiving a configuration of a packet size; and identifying the plurality of PDCP SDUs in a manner to restrict a size of the virtual PDCP SDU to be no larger than the packet size.

Example 34 includes the method of example 25 or some other example herein, further comprising: receiving a radio quality threshold; comparing a radio quality to the threshold; and generating the virtual PDCP SDU based on said comparing.

Example 35 includes the method of example 25 or some other example herein, further comprising: starting a PDCP discard timer based on generating the virtual PDCP SDU; and discarding the virtual PDCP SDU if the PDCP PDU has not been provided to a radio link control (RLC) sublayer when the PDCP discard timer expires.

Example 36 includes the method of example 25 or some other example herein, wherein the virtual PDCP SDU is a first virtual PDCP SDU, the PDCP PDU is a first PDCP PDU, and the method further comprises: starting a PDCP discard timer for a first PDCP SDU of the plurality of PDCP SDUs; discarding the first PDCP PDU upon determining that the first PDCP PDU has not been provided to a radio link control (RLC) sublayer when the expiration of the PDCP discard timer is detected; generating a second virtual PDCP SDU to include PDCP SDUs of the plurality of the PDCP SDUs other than the first PDCP SDU; and generating a second PDCP PDU to include the second virtual PDCP SDU.

Example 37 includes the method of example 25 or some other example herein, further comprising: determining that a successful delivery of the PDCP PDU has not been confirmed by sublayers below the PDCP sublayer; determining whether PDCP concatenation is configured; and retransmitting the plurality of PDCP SDUs based on whether the PDCP concatenation is configured.

Example 38 includes the method of example 37 or some other example herein, wherein the PDCP PDU is a first PDCP PDU, the SN is a first SN, and the method further comprises: determining PDCP concatenation is configured and a PDCP status report is not configured; allocating a second SN to the virtual PDCP SDU; and generating a second PDCP PDU with the virtual PDCP SDU and a header that includes an indication of the second SN.

Example 39 includes the method of example 38 or some other example herein, wherein out-of-sequence data forwarding is not enabled.

Example 40 includes a method of example 37 or some other example herein, further comprising: determining PDCP concatenation is not configured and a PDCP status report is configured; generating a plurality of PDCP PDUs to respectively include the plurality of PDCP SDUs, wherein each PDCP PDUs of the plurality of PDCP PDUs includes the SN and an indication of an order in which the corresponding PDCP SDU was in the virtual PDCP SDU.

Example 41 includes a method of example 40 or some other example herein, wherein out-of-sequence data forwarding is enabled.

Example 42 includes a method comprising: receiving a packet data convergence protocol (PDCP) packet data unit (PDU) from a radio link control (RLC) sublayer; determining, based on a header of the PDCP PDU, that the PDCP PDU includes a virtual PDCP service data unit (SDU) with a plurality of PDCP SDUs; demultiplexing the virtual PDCP SDU to obtain the plurality of PDCP SDUs; and providing the plurality of PDCP SDUs to a service data adaptation protocol (SDAP) sublayer.

Example 43 includes the method of example 42 or some other example herein, further comprising: performing deciphering and integrity verification on the virtual PDCP SDU.

Example 44 includes the method of example 42 or some other example herein, further comprising: performing a reordering operation based on a sequence number in the header.

Example 45 includes the method of example 42 or some other example herein, further comprising: performing a header decompression operation on the plurality of PDCP SDUs after demultiplexing the virtual PDCP SD Example 46 may include an apparatus comprising means to perform one or more elements of a method described in or related to any of examples 1-45, or any other method or process described herein.

Example 47 may include one or more non-transitory computer-readable media comprising instructions to cause an electronic device, upon execution of the instructions by one or more processors of the electronic device, to perform one or more elements of a method described in or related to any of examples 1-45, or any other method or process described herein.

Example 48 may include an apparatus comprising logic, modules, or circuitry to perform one or more elements of a method described in or related to any of examples 1-45, or any other method or process described herein.

Example 49 may include a method, technique, or process as described in or related to any of examples 1-45, or portions or parts thereof.

Example 50 may include an apparatus comprising: one or more processors and one or more computer-readable media comprising instructions that, when executed by the one or more processors, cause the one or more processors to perform the method, techniques, or process as described in or related to any of examples 1-45, or portions thereof.

Example 51 may include a signal as described in or related to any of examples 1-45, or portions or parts thereof.

Example 52 may include a datagram, information element, packet, frame, segment, PDU, or message as described in or related to any of examples 1-45, or portions or parts thereof, or otherwise described in the present disclosure.

Example 53 may include a signal encoded with data as described in or related to any of examples 1-45, or portions or parts thereof, or otherwise described in the present disclosure.

Example 54 may include a signal encoded with a datagram, IE, packet, frame, segment, PDU, or message as described in or related to any of examples 1-45, or portions or parts thereof, or otherwise described in the present disclosure.

Example 55 may include an electromagnetic signal carrying computer-readable instructions, wherein execution of the computer-readable instructions by one or more processors is to cause the one or more processors to perform the method, techniques, or process as described in or related to any of examples 1-45, or portions thereof.

Example 56 may include a computer program comprising instructions, wherein execution of the program by a processing element is to cause the processing element to carry out the method, techniques, or process as described in or related to any of examples 1-45, or portions thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    identifying a plurality of packet data convergence protocol (PDCP) service data units (SDUs);
    generating, based on one or more concatenation parameters, a PDCP packet data unit (PDU) to include the plurality of PDCP SDUs and a header with a concatenation field having a concatenation value to indicate that the PDCP PDU is concatenated, wherein the concatenation value is an identifier to identify, with reference to a lookup table or a number of predefined patterns, the one or more concatenation parameters; and
    providing the PDCP PDU to a radio link control (RLC) sublayer for transmission.

2. The method of claim 1, wherein the header further comprises:
    a packet-number field with a packet-number value to indicate a number of PDCP SDUs in the PDCP PDU; and
    a length field with a length value to indicate a length of each of the number PDCP SDUs.

3. The method of claim 1, wherein the plurality of PDCP SDUs comprises a first set of one or more PDCP SDUs and a second set of one or more PDCP SDUs and the header further comprises:
  a first packet-number field having a first packet number value to indicate a number of PDCP SDUs in the first set;
  a first length field having a first length value to indicate a length of each PDCP SDU of the first set of one or more PDCP SDUs; and
  a second length field having a second length value to indicate a length of each PDCP SDU of the second set of one or more PDCP SDUs.

4. The method of claim 1, further comprising:
  identifying a parameter that is preconfigured or signaled by a radio resource control (RRC) message that indicates a maximum number of PDCP SDUs that can be concatenated in one PDCP PDU; a maximum size of one PDCP PDU; a maximum size of a PDCP SDU that can be concatenated into one PDCP PDU; or an uplink or downlink direction in which concatenation of PDCP SDUs is permitted.

5. The method of claim 1, further comprising:
  transmitting or receiving an indication of a PDCP concatenation capability of a user equipment.

6. The method of claim 1, further comprising:
  identifying a plurality of service data adaptation (SDAP) PDUs, each SDAP PDU having a respective SDAP header and payload;
  determining that the SDAP headers of the plurality of SDAP PDUs have a common quality of service flow identifier; and
  generating, based on said determining, the plurality of PDCP SDUs to include one SDAP header and the payloads of the plurality of SDAP PDUs.

7. The method of claim 1, further comprising:
  identifying a plurality of service data adaptation (SDAP) PDUs, each SDAP PDU having a common header and a respective payload; and
  generating, based on said identifying, the plurality of PDCP SDUs to include the common header and the payloads of the plurality of SDAP PDUs.

8. The method of claim 1, wherein the
  one or more concatenation parameters include a number of PDCP SDUs that can be included in the PDCP PDU or a size of each PDCP SDU that can be included in the PDCP PDU.

9. The method of claim 1, further comprising:
  receiving, in downlink control information or a media access control control element, an indication that PDCP concatenation is activated; and
  generating the PDCP PDU based on the indication.

10. The method of claim 1, wherein the PDCP PDU is a first PDCP PDU, the plurality of PDCP SDUs is a first plurality of PDCP SDUs, and the method further comprises:
  identifying a second plurality of PDCP SDUs in a sequence, the second plurality of PDCP SDUs to include the first plurality of PDCP SDUs;
  determining a first PDCP SDU includes a reflective quality of service (QOS) indication (RQI) or reflective QoS flow to data radio bearer mapping indication (RDI) bit that indicates an update to a quality of service parameter;
  setting a second PDCP SDU that immediately precedes the first PDCP SDU in the sequence as a last PDCP SDU to be included in the first plurality of PDCP SDUs to be concatenated into the first PDCP PDU based on said determining; and
  generating a second PDCP PDU to include the first PDCP SDU and at least one additional PDCP SDU of the second plurality of PDCP SDUs.

11. The method of claim 1, wherein the PDCP PDU is to be transmitted over: a Uu interface between a user equipment and a base station; an F1 interface between a gNB distributed unit (DU) and a gNB central unit (CU); an E1 interface between a CU control plane and a CU data plane; an X2 interface between base stations; or an Xn interface between gNB CUs.

12. The method of claim 1, wherein the method is performed by a source base station, the PDCP PDU is to be transmitted to a user equipment (UE), and the method further comprises:
  determining the UE is being handed over to a target base station;
  determining whether the target base station supports concatenation; and
  forwarding the plurality of PDCP SDUs in the PDCP PDU or in a corresponding plurality of PDCP PDUs based on said determining whether the target base station supports concatenation.

13. The method of claim 1, further comprising:
  determining concatenation of the plurality of PDCP SDUs would not result in lower-layer segmentation; and
  generating the PDCP PDU to include the plurality of PDCP SDUs based on said determining.

14. The method of claim 1, further comprising:
  generating a concatenated PDCP SDU to include the plurality of PDCP SDUS; and
  performing ciphering and integrity protection on the concatenated PDCP SDU.

15. One or more non-transitory, computer-readable media having instructions that, when executed by one or more processors, cause a device to:
  identify a plurality of service data adaptation (SDAP) service data units (SDUs);
  generate an SDAP PDU for a first data radio bearer (DRB) to include the plurality of SDAP SDUs and a header with a field having a value to indicate that the SDAP PDU is concatenated, wherein the SDAP PDU is to be generated to include the plurality of SDAP SDUs based on a determination that the first DRB is configured with SDAP headers;
  generate a concatenated packet data convergence protocol (PDCP) PDU for a second DRB based on a determination that the second DRB is configured without SDAP headers; and
  provide the SDAP PDU to a PDCP sublayer for transmission.

16. The one or more non-transitory, computer-readable media of claim 15, wherein the instructions, when executed, further cause the device to:
  determine the plurality of SDAP SDUs have a common quality of service flow identifier (QFI); and
  generate the SDAP PDU to include the plurality of SDAP SDUs based on said determination that the plurality of SDAP SDUs have a common QFI.

17. The one or more non-transitory, computer-readable media of claim 15, wherein the header further comprises:
  a packet-number field having a packet number value to indicate a number of SDAP SDUs in the SDAP PDU; and a length field with a length value to indicate a length of each of the number SDAP SDUs.

18. An apparatus comprising:
processing circuitry to:
   receive a packet data convergence protocol (PDCP) packet data unit (PDU) from a radio link control (RLC) sublayer;
   determine an identifier in a header of the PDCP PDU;
   determine, based on the identifier and a lookup table or a number of predefined patterns, one or more concatenation parameters;
   process the PDCP PDU, based on the one or more concatenation parameters, to receive a plurality of PDCP SDUs; and
interface circuitry, coupled with the processing circuitry, to enable communication.

19. The apparatus of claim 18, wherein the processing circuitry is further to:
perform deciphering and integrity verification on the plurality of PDCP SDU.

* * * * *